(12) United States Patent
Schedletzky

(10) Patent No.: US 8,191,549 B2
(45) Date of Patent: Jun. 5, 2012

(54) TUBE COLLECTOR WITH VARIABLE THERMAL CONDUCTIVITY OF THE COAXIAL TUBE

(76) Inventor: Maik Schedletzky, Leipzig (DE)

( * ) Notice: Subject to any disclaimer, the term of this patent is extended or adjusted under 35 U.S.C. 154(b) by 308 days.

(21) Appl. No.: 12/520,352

(22) PCT Filed: Dec. 19, 2007

(86) PCT No.: PCT/EP2007/064275
§ 371 (c)(1),
(2), (4) Date: Jun. 19, 2009

(87) PCT Pub. No.: WO2008/074852
PCT Pub. Date: Jun. 26, 2008

(65) Prior Publication Data
US 2010/0018522 A1 Jan. 28, 2010

(30) Foreign Application Priority Data

Dec. 19, 2006 (DE) .................. 10 2006 060 012
Mar. 6, 2007 (DE) .............. 20 2007 003 441 U

(51) Int. Cl.
| F24J 2/46 | (2006.01) |
| F24J 2/24 | (2006.01) |
| F24J 2/50 | (2006.01) |
| F16L 9/18 | (2006.01) |

(52) U.S. Cl. ......... 126/704; 126/651; 126/652; 138/114
(58) Field of Classification Search .................. 126/651, 126/652, 704; 138/114
See application file for complete search history.

(56) References Cited

U.S. PATENT DOCUMENTS

| 4,153,042 | A | * | 5/1979 | Tragert | 126/649 |
| 4,282,857 | A | * | 8/1981 | Pei | 126/584 |
| 4,299,203 | A | * | 11/1981 | Skopp | 126/638 |
| 4,469,088 | A | * | 9/1984 | Anzai et al. | 126/618 |
| 6,598,601 | B2 | * | 7/2003 | Schutz | 126/655 |
| 6,817,357 | B2 | * | 11/2004 | Brunotte et al. | 126/655 |
| 7,137,413 | B2 | * | 11/2006 | Bauer et al. | 138/39 |

FOREIGN PATENT DOCUMENTS

| DE | 19919835 A1 | * | 11/2000 |
| JP | 60108641 A | * | 6/1985 |

\* cited by examiner

*Primary Examiner* — Kenneth Rinehart
*Assistant Examiner* — William Corboy
(74) *Attorney, Agent, or Firm* — IP Strategies

(57) ABSTRACT

Collector tube for a solar collector, having an envelope tube, an absorber tube which is arranged within the envelope tube and into whose interior a heat carrier medium can be carried, characterized by an inner tubular element which is arranged within the absorber tube and has a thermal conductivity which is variable. Distributor segment for at least one collector tube which is designed in particular according to one of the preceding claims, having at least one first opening for supplying a heat carrier medium into the at least one collector tube, at least one second opening for carrying the heat carrier medium away from the at least one collector tube, a channel for supplying the heat carrier medium from outside the at least one collector tube into the at least one collector tube, a channel for carrying the heat carrier medium away from the collector tube to outside the at least one collector tube, with the supply channel and the output channel being arranged such that the distributor segment can be directly coupled to at least one further identical distributor segment in a heat carrier medium circuit.

36 Claims, 18 Drawing Sheets

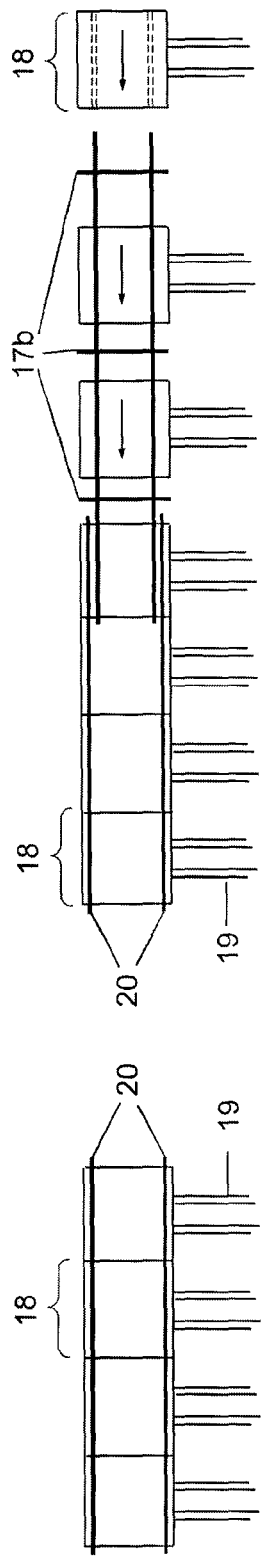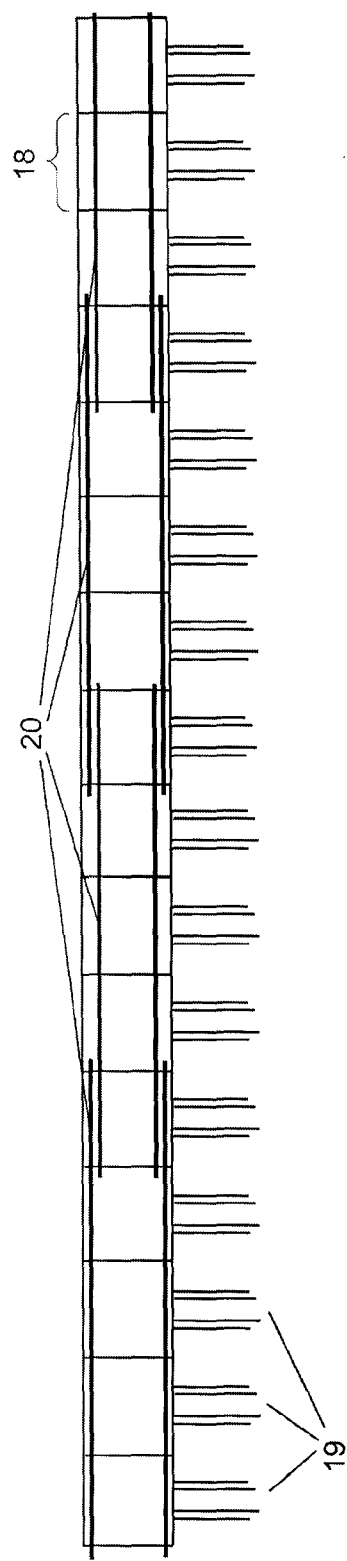

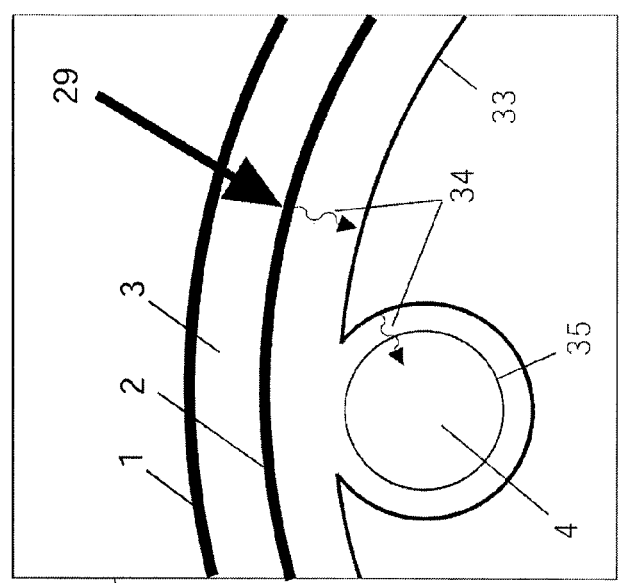
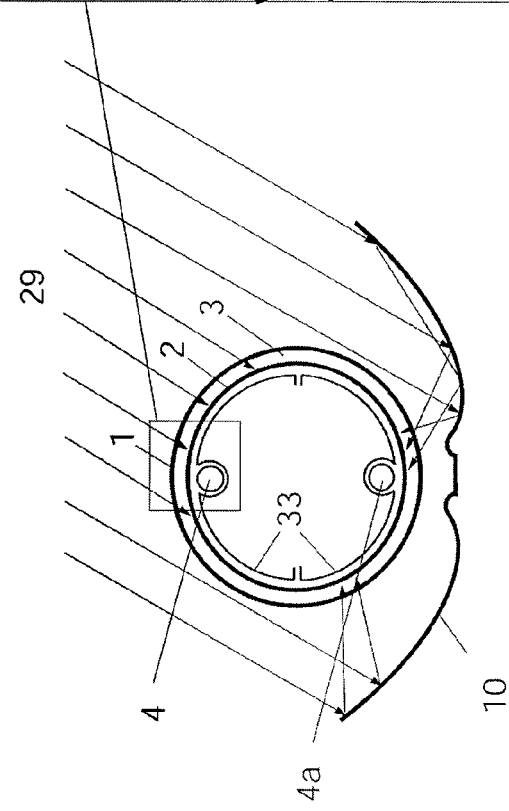
Fig. 15a
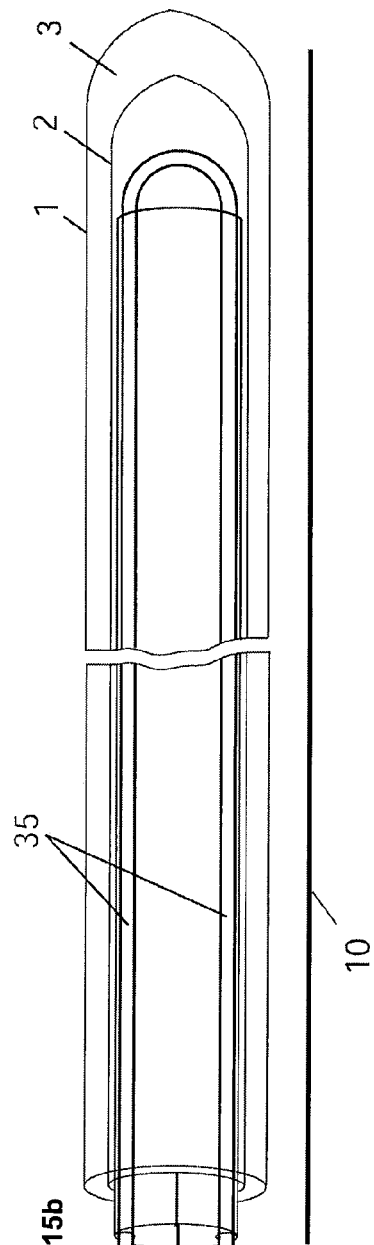
Fig. 15b

TUBE COLLECTOR WITH VARIABLE THERMAL CONDUCTIVITY OF THE COAXIAL TUBE

The present invention relates to a collector tube, a manifold segment for a collector tube and a tube collector.

Known are sunlight-absorbing tube collectors of which each collector tube comprises one transparent cover tube and one absorber tube. FIG. 15a, b show such a prior art collector tube. Cover tube 1 and absorber tube 2 are closed on one end and fused together at the other end. Between tube 1 and tube 2 is a vacuum or a gas with low thermal conductivity so that a structure is produced similar to a thermos bottle—with a cavity 3. The absorber tube 2 serves as light absorber and has therefore an absorber coating. The light 29 comes through the transparent cover tube 1 onto the absorber coating 2 which is inside the evacuated space. The heat produced in the absorber surface will be transferred onto a heat conducting sheet 33 which rests against the inside of the absorber tube 2 and lines the cavity 3 of the collector tube. To transfer the heat onto the heat transfer medium 4, 4a, the heat conducting sheet 33 is connected to a U-shaped tube 35, in which the to-be-heated heat transfer medium 4, 4a flows. Air gaps or oxidation layers between heat conducting sheet 33 and U-shaped tube 35 or absorber tube will lead to thermal contact resistance and will lower the collector efficiency. Proportional to the absorber surface, the volume of the heat transfer medium should not be too large so that the heat transfer medium heats up quickly and the collector reacts swiftly. Since less light is irradiated onto the light-averted side of the collector than onto the front side, reflectors are used. These reflect the radiation, which hits the reflector between the tubes, onto the light-averted side of the collector tubes. At vertical direct solar radiation and a reflector width which equals twice the diameter of the tubes, the backs of the collector tubes receive nearly as much light as the fronts. In diffuse light conditions, the tubes partially shade the reflector, so that significantly less light can be reflected onto the back of the tubes. In Germany, for example, the yearly proportion of diffuse light is about 50% of the global radiation. The consequence is that—at diffuse light conditions—the reflector is not significantly raising the collector performance. At direct light, the reflector is raising the performance of the collector. In case of stagnation, for example when the storage is full or the pump is damaged and the heat can not be removed from the collector, the additional radiation from the reflector will have negative effects on the operational safety; because at temperatures between 250 to 300° C., the generation of vapor can lead to damages in the system or to the ageing of the anti-freeze fluid. Manifolds that deliver or remove the heat transfer medium to or from the collector tubes are therefore usually made of copper to resist these temperatures. To reduce heat losses, the manifolds are surrounded by high-temperature-resistant insulating materials. Generally, aluminum boxes are used to fix the collector tubes as well as all other collector components. By using a plurality of collector parts, the assembly effort is high and, in connection with the used materials, it causes high production costs.

BRIEF SUMMARY OF THE INVENTION

The object of the invention is therefore to provide elements for a solar collector which limit the maximum temperature and which especially allow the use of materials with low temperature resistance, to reduce the variety of components with the aid of new production processes. Furthermore, a high efficiency shall be achieved. This problem will be solved with the collector tube according to claim 1, with the manifold segment according to claim 20 and with the tube collector according to claim 24. Advantageous further developments of the invention are defined in the respective subordinate claims.

Considering the aspects of a high efficiency, the invention proposes, according to claim 1, a collector tube which reduces the stagnation temperature. According to the present invention, the heat transfer medium is not flowing through a U-shaped tube but directly along the inner wall of the absorber tube. This eliminates thermal contact resistance between absorber tube, heat conducting sheet and U-shaped tube, and the collector efficiency is raised. In addition, it minimizes the volume of the to-be-heated heat transfer medium, to reduce the reaction time of the collector. For this reason, every collector tube has a coaxial tube inside its cavity. The coaxial tube separates the entering cold heat transfer medium from the heated heat transfer medium. The cold heat transfer medium flows inside the coaxial tube to the lower end of the collector tube and flows back between the outside of the coaxial tube and the inner surface of the absorber tube for thermal absorption. In cross-section, the coaxial tube is eccentrically located in the cavity of the collector tube. The eccentricity of the coaxial tube is oriented towards the light-averted side of the collector tube. Thus, the volume of the to-be-heated heat transfer medium decreases at the light-averted side and at the same time increases at the light-facing side. That way, the heat transfer medium is being heated up on the light-averted side, in spite of low light radiation, as quickly as on the light-facing side. The reflector may be sized smaller in proportion to the diameter of the tube. In diffuse light conditions, the smaller reflector has only minor effects, but it ensures that the stagnation temperature rises less under direct normal radiation.

If a collector is oriented towards the south, the greatest part of the to-be-heated heat transfer medium will be located on the south side of the collector tubes and will be irradiated directly by the sun. When the sun shines in the morning or evening hours from the side on the collector, it is advantageous when also the greatest amount of the to-be-heated heat transfer medium will be at the places of highest light intensity. Therefore, the coaxial tube inside the collector tube will be laterally adjusted depending on the time. That way, the to-be-heated heat transfer medium has, for example, at south-eastern radiation the smallest volume at the opposite side—namely in north-western direction—and the biggest volume of the to-be-heated heat transfer medium will be at the directly irradiated side. The lateral adjustment will be carried out according to the particular position of the sun. To carry out the lateral adjustment of the coaxial tube in the collector tube, components are preferably used that change their form and/or their volume at temperature changes. These components are, for example, located between absorber tube and coaxial tube in such a way that they are simultaneously heated by the heat transfer medium. If the heat transfer medium is heated up unequally, for example between east and west side, because of solar irradiation from the side, the component will be deformed stronger on the warmer side than on the shady side. With the deformation of the component, the coaxial tube will be laterally adjusted until the different volumes of the to-be-heated heat transfer medium compensate the unequal radiation and the temperature will be equalized.

According to the invention, the thermal conductivity of the coaxial tube is variable. Since the hot and the cold transfer medium—separated by the coaxial tube—are passing each other in counter flow, the thermal conductivity of the coaxial tube should be as low as possible in normal operation to avoid the heat to be transferred from the heated to the cold heat transfer medium. In case of a breakdown, however, the thermal conductivity of the coaxial tube should be as high as possible, in order for the heat to be easily transferred onto the incoming cold water, which is in this case a cold water reservoir, and thus the stagnation temperature will be lowered. The variable thermal conductivity of the coaxial tube will be advantageously carried out by a double-walled glass tube, which holds a small amount of liquid and a gas or a gas mixture inside. This type of coaxial tube will be hereinafter referred to as convection carboy.

The variable thermal conductivity of the coaxial tube can also be reached in a further embodiment of the invention by using materials like bimetals or materials with shape memory which can create thermal bridges in the double-walled coaxial tube. Also materials are possible that show a variable thermal conductivity as a result of changes in their molecular structure. A further option according to the invention is that a double-walled coaxial tube is used which is provided with special layers for emission and absorption of heat radiation. The outer tube of the double-walled coaxial tube will therefore be applied with a variable selective coating on the inner surface. This coating emits no or only little heat radiation at low temperatures, as prevailing in normal operation of the collector. Only at high temperatures, like in case of stagnation, or when exceeding a limit temperature, the variable selective coating is able to radiate heat. To avoid reflection of the inner coaxial tube, an absorption coating can be applied on the outside of the inner coaxial tube. After absorption, the heat will be transferred through the inner coaxial tube onto the cold water reservoir. Inner and outer coaxial tube are preferably connected with each other at the ends, so that a cavity is created. Since the emission and absorption coatings are inside the cavity of the coaxial tube, they do not come in contact with the heat transfer medium and are therefore protected from abrasion, debris and chemical transformation. The position of the inner coaxial tube in the outer coaxial tube can be concentric or eccentric. Ceramic coatings with an absorption maximum in the infrared range of the light spectrum are particularly suitable as absorption coating of the inner coaxial tube. To avoid heat transfer as a result of thermal conduction also at low temperatures, the cavity of the coaxial tube can be evacuated.

The functionality of the coaxial tube with variable thermal conductivity according to the invention will be explained in detail with the convection carboy. The convection carboy consists of a double-walled coaxial tube, whose ends are connected so that a cavity between inner and outer tube is created, in which convection can take place. The cavity will be filled with a small amount of a medium which evaporates at a certain temperature. This medium will be referred to as convection medium.

In normal operation the cold and the warm heat exchange medium are separated by the coaxial tube or rather by the convection carboy. The heat transfer medium rises along the absorber wall upwards and heats up. In the lower part of the tube, the heat transfer medium is still cold so that the convection medium in the convection carboy is in the liquid state. The upper part of the convection carboy holds a gas or a gas mixture with low thermal conductivity. Different noble gases, for example, are particularly well suited. Also a low pressure decreases the thermal conductivity. The relatively low thermal conductivity of the gas ensures that only little heat is transferred onto the cold heat transfer medium in the inside. In case of stagnation, the heat transfer medium between absorber tube and convection carboy heats up at the full length, up to the lower part, where the convection carboy holds the convection medium. If the temperature of the heat transfer medium exceeds the temperature of ebullition of the convection medium, this medium will change to the vapor state. The resulting vapor rises along the outer wall of the convection carboy and continues to absorb heat from the heat transfer medium. On the inner surface of the convection carboy, the convection medium condenses and releases heat to the cold heat transfer medium. The condensed convection medium flows down. With the convection of the convection medium, a cycle is created, in which the heat is transferred from the absorber coating on the inner surface of the convection carboy to the cold water reservoir. On the one hand, this avoids the heat transfer medium on the outside of the convection carboy to heat up too much and to cause damages. On the other hand, the collector performance is raised, since the heat emission to the outside is minimized through a low collector temperature, and the heat carried to the inside will not get lost. Depending on the used convection liquid, as for example ethanol, water or a mixture of materials, and the prevailing pressures in the convection carboy, the temperature of ebullition and with it also the start of the heat transfer can be defined. In order to have the heat transfer jump up quickly due to the convection, it is advantageous to seal off the convection medium with a second substance against the gas space above in the convection carboy. By doing so, the evaporation of the convection medium and with that the convection begins only on a big scale when the convection medium has been heated up to boiling point. The substance used as sealant should advantageously not be mixable with the convection medium, have a higher boiling point and a lower specific weight. For example, water could be used as convection medium and oil or paraffin could be used as sealants.

A further type of the coaxial tube with variable thermal conductivity according to the invention consists of a coaxial tube made up of at least two tubes nested into each other. The result is a coaxial tube with several "layers". The tubes are in each case open at both ends. The openings of the inner tubes are preferably smaller at the inlet side for the cold heat transfer medium than the opening of the outer tube. This way, most of the cold heat transfer medium flows down in the outer layer of the coaxial tube, between the outer tube and the next inner tube. Heat that is transferred across the wall of the outer tube onto to the cold heat transfer medium, will be carried to the outlet side of the coaxial tube. Afterwards, the heat transfer medium flows up again in the gap between the inner surface of the absorber tube and the outside of the coaxial tube, where it continues to heat up. During normal operation, only little heat reaches the cold water reservoir inside of the coaxial tube, since the heat will be removed from the outer coaxial tube layer. The heat transfer can be further reduced by using further similar coaxial tube layers. The ratio of the volume flows of the heat transfer medium through the layers of the coaxial tube is defined by the ratio of the tube openings between the layers.

In case of stagnation, when no heat transfer medium circulates in the collector, the heat removal from the outer and the inner coaxial tubes will also be interrupted. The heat is then transferred through the walls of the coaxial tube from layer to layer into the inside of the coaxial tube to the cold water reservoir. By removing the heat from the absorber tube to the cold water reservoir, an overheating will be avoided.

Relevant for the stagnation temperature is the ratio of the absorber surface to the volume of the heat transfer medium. The larger the volume in proportion to the absorber surface, the lower is the stagnation temperature, since the light intensity and the sunshine duration of a day are limited. In contrast to conventional solar collectors which release, on the level of the stagnation temperature, as much heat to the surrounding area as much light energy they receive, the device according to the invention stores a great part of the heat, that is not removed, in the inside of the collector. This heat will only be released slowly to the environment and is also available after sunset. The heat transfer medium in the gap between coaxial tube and absorber tube cools down slowly when no more light is absorbed—depending on the quality of the selective coating and of the vacuum. The release of the heat that is stored in the cold water reservoir is carried out, according to the invention, by the coaxial tube. At temperatures inside the cold water reservoir that are above the boiling temperature of the convection medium, the heat release happens quickly, since the coaxial tube has a high thermal conductivity. The high thermal conductivity in the convection carboy results from a convection in reverse directions, in which heat is carried from the inside to the outside. While increasingly cooling down, the convection liquid condenses more and more and the thermal conductivity of the convection carboy decreases. The residual heat from the cold water reservoir is increasingly slowly released to the surrounding area. The advantage is that, on the one hand, this heat can still be used over a longer period. On the other hand, the time period of one night is long enough to let the heat transfer medium cool down so that it presents also on the next day a sufficient cold water reservoir to limit the stagnation temperature. With other types of the coaxial tube, when it can be anticipated that the heat transfer medium with a large volume and at warm nights does not cool down completely, as it is possible in southern countries, a device ensures that the heat is not only removed to the environment through the coaxial tube but that the convection of the heat transfer medium starts on its own. Therefore, a connection with a valve will be created between the manifolds for the warm and the cold heat transfer medium. The valve opens and closes a circuit between the cold and the warm heat transfer medium. When the valve opens, the warm heat transfer medium will rise from the inside of the coaxial tube upwards. On the outside of the coaxial tube or by an interconnected chiller, the heat transfer medium is cooled down, sinks and flows bottom-up into the inside of the coaxial tube. This way, the high thermal contact resistance of the coaxial tube is bypassed and even a big heat transfer medium volume can completely be cooled down, so it is able to absorb an adequate amount of energy on the following day.

The big diameter of the coaxial tubes provides advantages for an easier ventilation, since air bubbles can rise in the coaxial tube without being carried away by the flow of the heat transfer medium. This uncomplicated way of venting provides the opportunity to connect the collector with a drainback system, in which the heat transfer medium is drained when the system stagnates. This offers another possibility to cool down the heat transfer medium overnight. The advantage is also that at very low temperatures during the winter the heat transfer medium flows into the collector with a relatively high temperature level (room temperature) and no energy is needed to raise the temperatures of the heat transfer medium from minus up to this level.

Devices that are used to shade the collector completely or partially in the summer at noon also contribute to limiting the stagnation temperature. Advantageous is a transparent cover of the collector, for example in the form of a glass panel, which is positioned in a way that in the summer at noon a reflection is caused. The direct light will be reflected in a way that it will not reach the collector. During all other times, the light can largely unhindered reach the collector.

When filled, the collectors according to the invention have a considerable higher weight than conventional collectors, which is advantageous concerning wind loads, when they are mounted free-standing—for example on flat roofs. No additional weights have to be provided.

By limiting the stagnation temperatures, it is possible to do completely without expensive metals like aluminum or copper and to advantageously use plastic instead. On the one hand, using plastic allows new inexpensive manufacturing processes like injection molding. On the other hand, the functions of several collector components, as for example the manifold inlet for the cold and outlet for the warm heat transfer medium as well as the heat insulation, the locking device of the collector tubes, the manifold box and the mounting device for the collector installation can be integrated in one single component. The integration of different functions within one component, however, causes also problems, when there are warm and cold zones which expand unequally and which will lead to a deformation of the component. This is the case, for example, when the manifold for the cold and hot heat transfer medium are intended to be in one component. The solution to this problem lies in a segmentation of the manifold. Every segment has the same or similar functions, whereas unequal expansions within one segment will be compensated by flexible elements between the segments. The size of one segment will be determined by the expected maximum differences in temperature within one segment and by the differences in length that can be tolerated.

The manifold segment according to the invention can hold one or more collector tubes.

There are channels in the manifold segment according to the invention for the heat transfer medium. The cold heat transfer medium flows inside the upper channel and the warm medium flows inside the lower channel. The collector tube will be fastened from the bottom in an opening of the channel for the warm heat transfer medium and it will be sealed up with seals. The coaxial tube which is inside the collector tube will be fastened in an opening of the channel for the cold heat transfer medium and it will also be sealed up. Thus, the cold heat transfer medium can flow out off the channel of the manifold into the coaxial tube, leave the inside of the coaxial tube at the lower end, flow up between the absorber tube and the outside of the coaxial tube and finally flow into the channel of the manifold for the warm heat transfer medium. According to the invention, the inlet and outlet channels are arranged in such a way that several manifold segments can be directly connected in one heat transfer medium circuit, that means without pipes, tube sections or the like. That way, it is possible to design any tube collector system with one type of manifold segments. Furthermore, the arrangement of the manifold segments (and the attached collector tubes) can directly be changed at the place of installation by adding or removing the segments, when it turns out that the dimensions of the system were miscalculated. Several manifold segments are kept together by connecting elements. Connecting elements can for example be jigs, clamps or threaded rods. For endless installation, threaded rods are preferably used, on which the manifold segments with appropriate bores will be stringed. Seals are placed between the manifold segments as flexible elements to compensate the heat expansion and to seal up.

A particularly advantageous design of a segment for a collector tube as well as for a coaxial tube is made of heat-resistant plastic, produced by injection molding. This production process permits low piece costs, uses also the segmentation of the manifolds, since that way the unequal thermal expansion within one component can be compensated the easiest way.

The openings for the collector tube and for the coaxial tube are positioned in a way that they create the correct eccentric positions for the coaxial tube in the cavity of the collector tube. Hollow chambers which can be located around the channels for the heat transfer medium, serve for heat insulation. They can additionally be filled with heat-insulating materials.

If the connections for the inlet and outlet of the heat transfer medium shall be located on one side of the collector, provisions are made that in an advantageous further development of the invention a further channel will be integrated, to achieve an equal distribution of the decreases in pressure within one collector by the use of a so called Tichelmann-system. It is advantageous to determine the cross-sections of the channel in a manifold segment for the inlet and outlet of the heat transfer medium into and out off the collector tubes in such a way that the decreases in pressure of inlet and outlet of the heat transfer medium including the decreases in pressure inside the tubes are all equal. That way, it is possible to string together an optional number of manifold segments and to variably design the collector size. If collectors are used, in which the to-be-heated heat transfer medium is separated from the cold incoming heat transfer medium, as it is for example the case when using coaxial tubes, an advantageous further development of the manifold segment will have a valve between the channels for the cold and the hot heat transfer medium. The valve creates a connection between the cold and the hot heat transfer medium, the result is a cycle that is gravity-driven. The cycle may serve for the transport of the heat from the absorber layer into the cold water reservoir, to avoid high stagnation temperatures, or in the opposite direction, to transport heat from the heated cold water reservoir to the absorber layer where it will be gradually emitted at night. The manifold segments can be designed in a way that a panel can be attached as decorative element or as UV-radiation and weather protection.

The manifold segment with the connection and the sealing elements provides a kind of a construction kit with a minimum number of different components of which almost any tube collector system can be assembled and altered. Especially this small number of different components is appealing to be used in the area where stock-keeping and acquisition are important factors.

The invention involves also a tube collector that comprises at least one of the components according to the invention.

BRIEF DESCRIPTION OF THE DRAWINGS

The drawing shows advantageous embodiments of the invention. It shows

FIG. 10a a collector consisting of four manifold segments;

FIG. 10b the endless installation of a collector made of manifold segments with connection elements;

FIG. 10c the arrangement of connection elements with an endlessly installed collector;

FIG. 15a a Sydney tube in cross-section according to prior art;

FIG. 15b the Sydney tube in longitudinal section according to prior art;

DETAILED DESCRIPTION OF THE INVENTION

Figure 1:
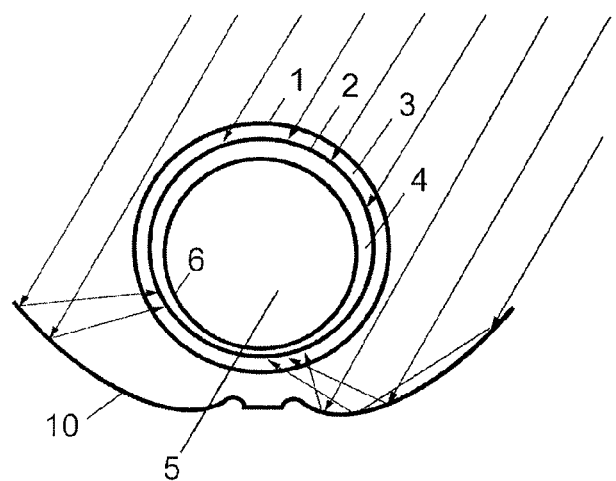
FIG. 1 a cross-section of a Sydney tube with eccentrically mounted coaxial tube.

FIG. 1 shows the cross-section of a collector tube consisting of one cover tube 1 and one absorber tube 2 with eccentrically mounted coaxial tube 6. The space between the cover tube 1 and the absorber tube 2 is evacuated space 3. The heat transfer medium 4 absorbs the heat from absorber tube 2, by flowing in a gap with varying width between the absorber tube and the coaxial tube. The cold incoming heat transfer medium 5 is located in the inside of the coaxial tube and provides a cold water reservoir 5. A reflector 10 is located on the light-averted side of the collector. It reflects the light onto the sun-averted side of the collector tube 1, 2.

Figure 2:
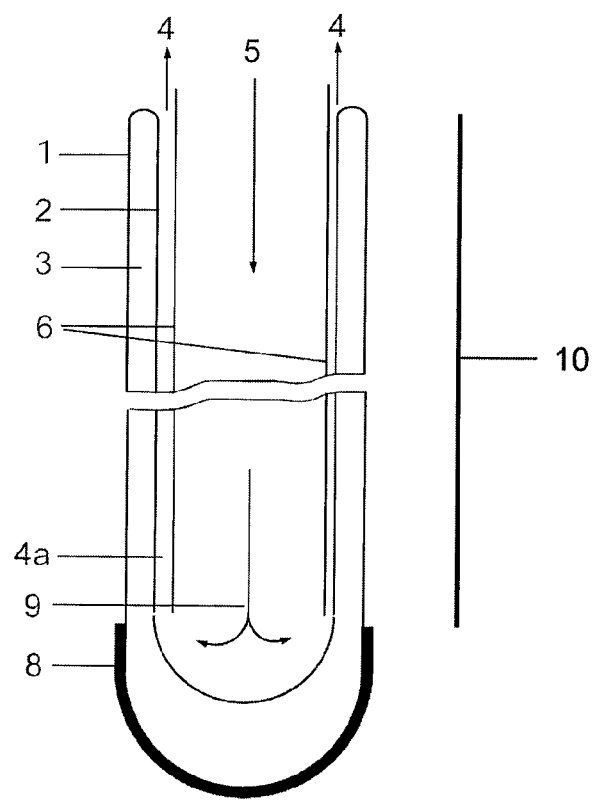
FIG. 2 a side view of a Sydney tube with eccentrically mounted coaxial tube.

FIG. 2 shows the longitudinal section of the collector tube consisting of one cover tube 1 and one absorber tube 2 with eccentrically mounted coaxial tube 6. The cold incoming heat transfer medium 5 flows according to the indicated arrows 9 downwards. Then, it flows between absorber tube 2 and coaxial tube 6 upwards. If the absorber tube 2 absorbs light, the cold heat transfer medium 4a will slowly heat up and leave the tube as warm heat transfer medium 4 at the upper end of the collector tube 1, 2.

Figure 3:
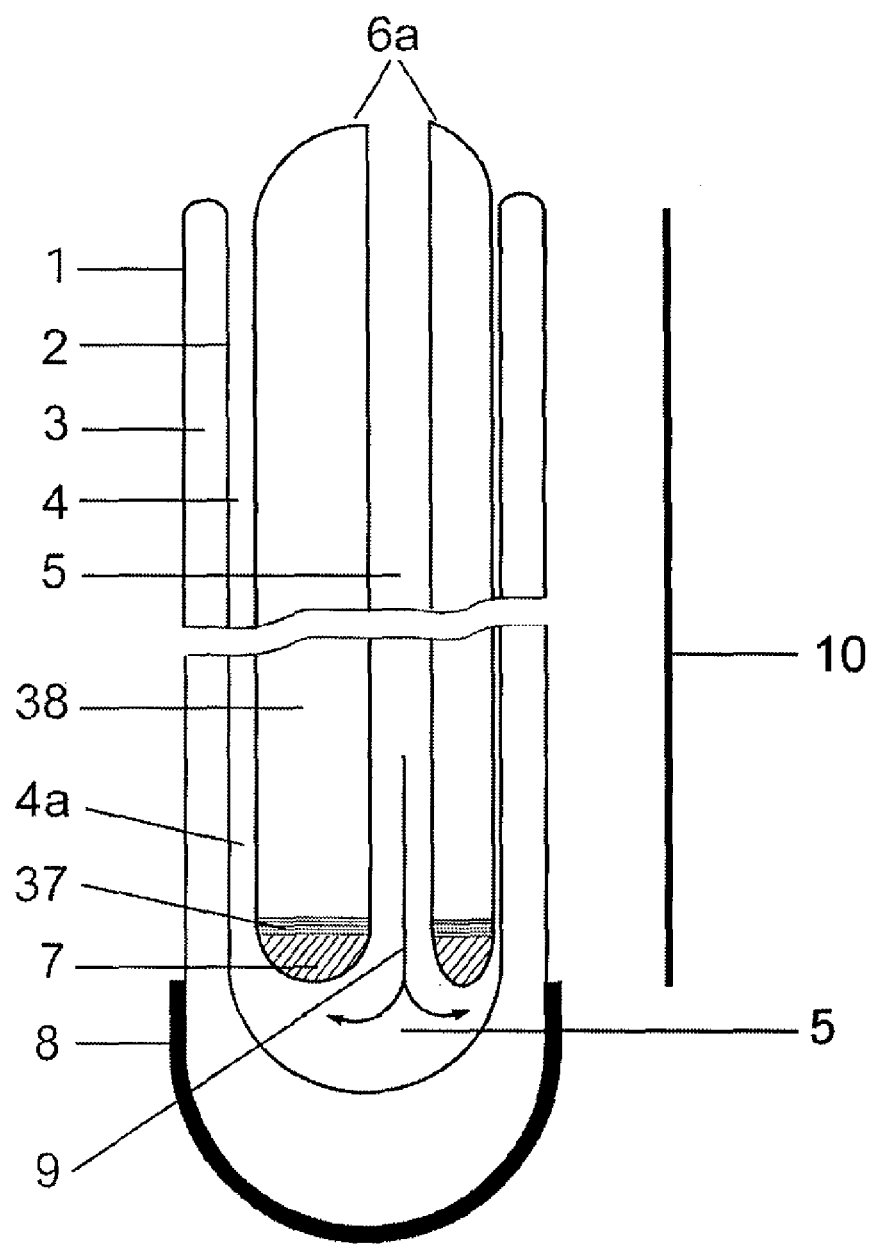
FIG. 3 a side view of a Sydney tube with eccentrically mounted convection carboy and liquid convection medium during normal operation.

As shown in FIG. 3, the coaxial tube 6 can also be designed as double-walled tube so that a convection carboy 6a is created. The convection carboy 6a forms a closed system that contains a convection medium 7. Additionally, the convection carboy 6a can also be filled with gases 38, which have a low thermal conductivity. During normal operation at relatively low temperatures, the convection medium 7 is liquid and it accumulates in the lower end of the cold area of the heat transfer medium 5, 4a of the collector tube 1, 2. The convection medium 7 can be sealed up against the gas chamber 38 with a sealant 37, so that the convection medium 7 only evaporates on a large scale, when its boiling point is reached.

Figure 4:
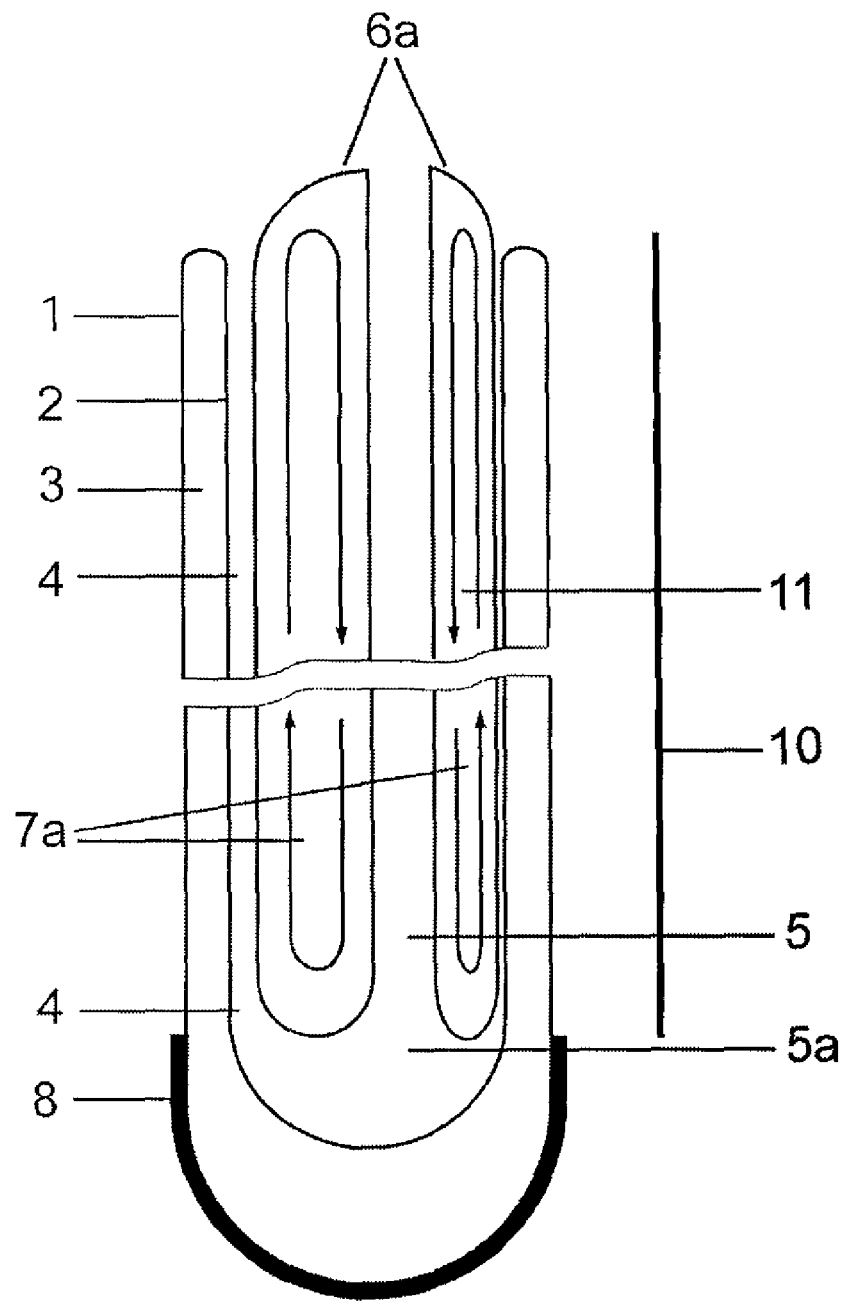
FIG. 4 a side view of a Sydney tube with eccentrically mounted convection carboy and evaporated convection medium during stagnation.

FIG. 4, however, shows the state in which the convection medium 7, 7a is evaporated. This state is reached when the removal of the warm heat transfer medium 4 is blocked, so that also the lower part of the collector tube 1, 2, 4, 5a heats up. The evaporating convection medium 7a rises up. During this process, it continues to absorb heat from the heat transfer medium 4 through the outer wall of the convection carboy 6a. This heat will be transferred from the inner surface of the convection carboy onto the cold water reservoir 5. The convection 11 inside the convection carboy 6a will continue according to the direction of arrow as long as the temperatures between the heat transfer medium 4 and the cold water reservoir 5 are balanced or are lower than the temperature of ebullition of the convection medium 7, 7a.

Figure 5:
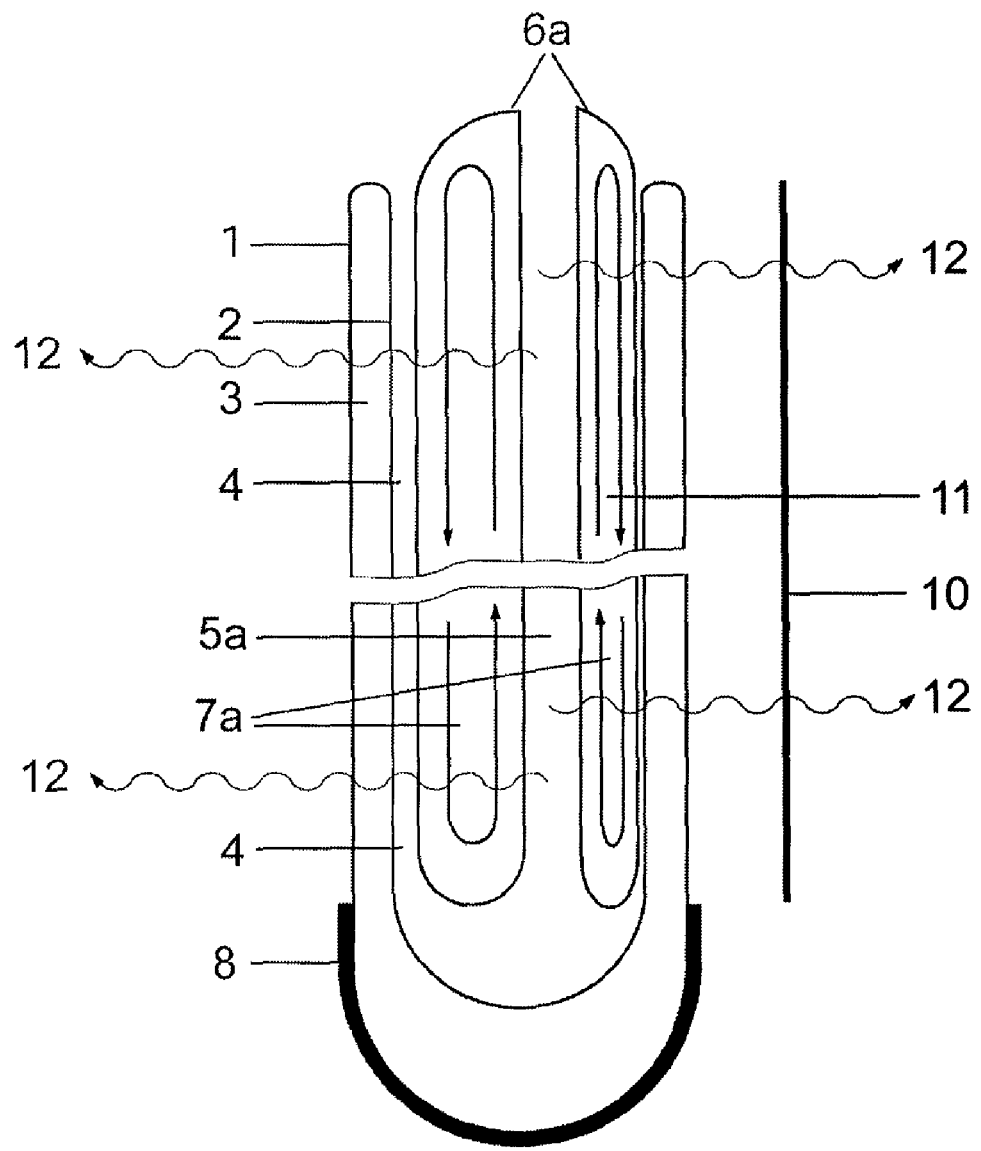
FIG. 5 the heat emission from the heated cold water reservoir through the convection carboy.

FIG. 5 shows the process of emitting heat from the cold water reservoir 5a. At darkness, there is no more heat transferred from the absorber tube 2 to the heat transfer medium 4, 4a. The heat transfer medium 4, 4a is gradually cooling down, since heat is emitted to the surrounding area 12. If the temperature of the cold water reservoir 5a is above the temperature of ebullition of the convection medium 7, 7a, the direction of flow in the convection carboy will reverse. The evaporated convection medium 7a rises up along the inner surface of the convection carboy 6a, absorbs heat from the cold water reservoir 5a and releases the heat to the heat transfer medium 4, 4a. The more the cold water reservoir 5a cools down, the less heat will be released by the convection carboy 6a to the surrounding area. The heat emission drops when the temperature of the cold water reservoir 5a decreases below the temperature of ebullition of the convection medium 7, 7a.

Figure 6:
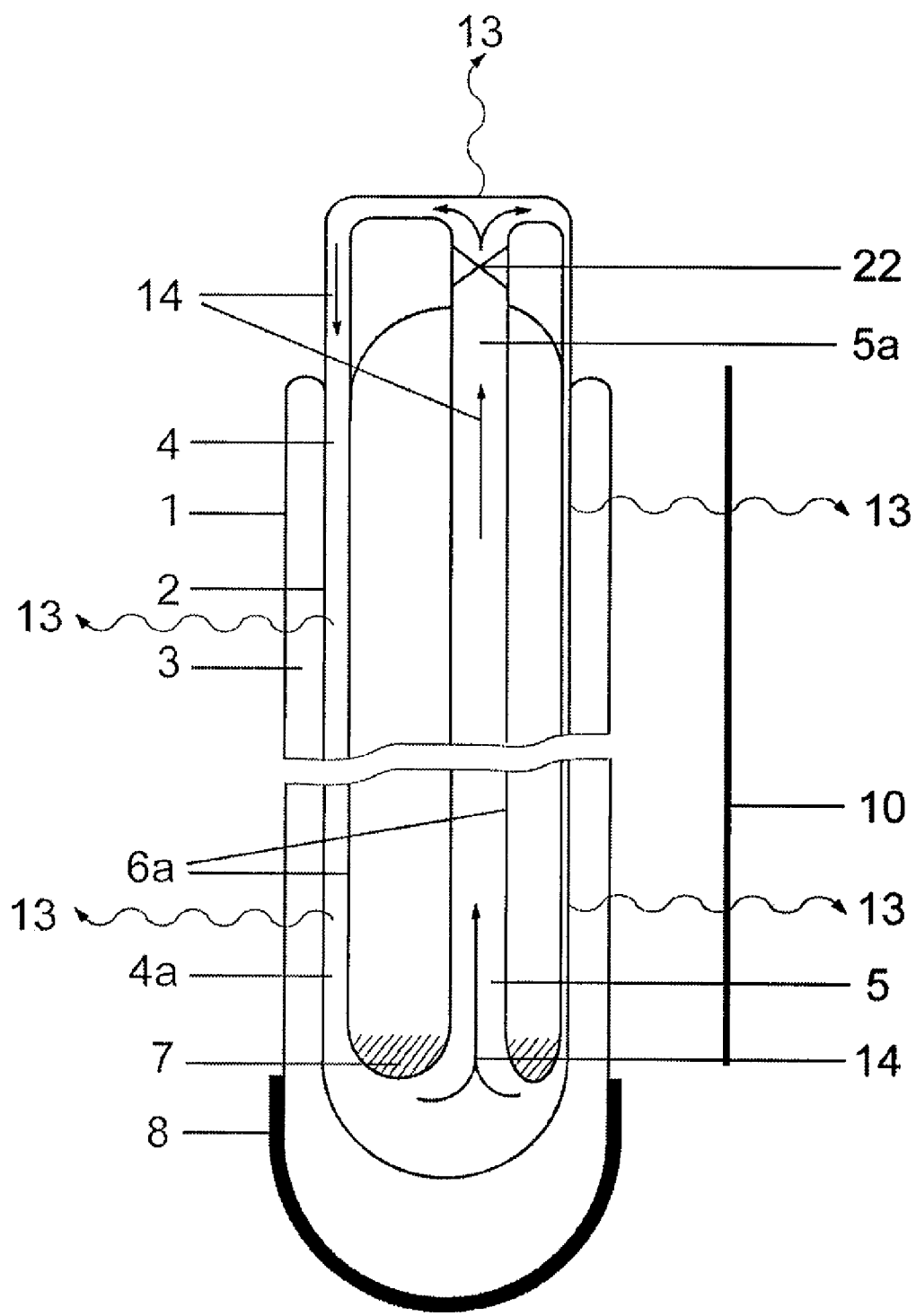
FIG. 6 the heat emission from the heated cold water reservoir through the convection of the heat transfer medium.

If the heat emission from the cold water reservoir 5a needs to be accelerated, independent of the convection carboy 6a—which can be the case when large volumes of the cold water reservoir 5a have to be cooled down—the convection of the heat transfer medium 5, 5a, 4, 4a, as shown in FIG. 6, can be used. For that purpose a valve 22 will be opened so that the heat transfer medium 5, 5a, 4, 4a can circulate. The heat transfer medium 4, 4a is cooled down between the absorber tube 2 and the outer wall of the convection carboy 6a by heat radiation 13 or by a separate load. These loads could, for example, be cooler or storages which are arranged in proper position to the collector. When cooling down, the density of the heat transfer medium 4, 4a rises so that it sinks down, and as a result, the warm heat transfer medium 5a flows from the cold water reservoir 5a in the gap between the absorber tube 2 and the outer wall of the convection carboy 6a into a separate load.

Figure 7:
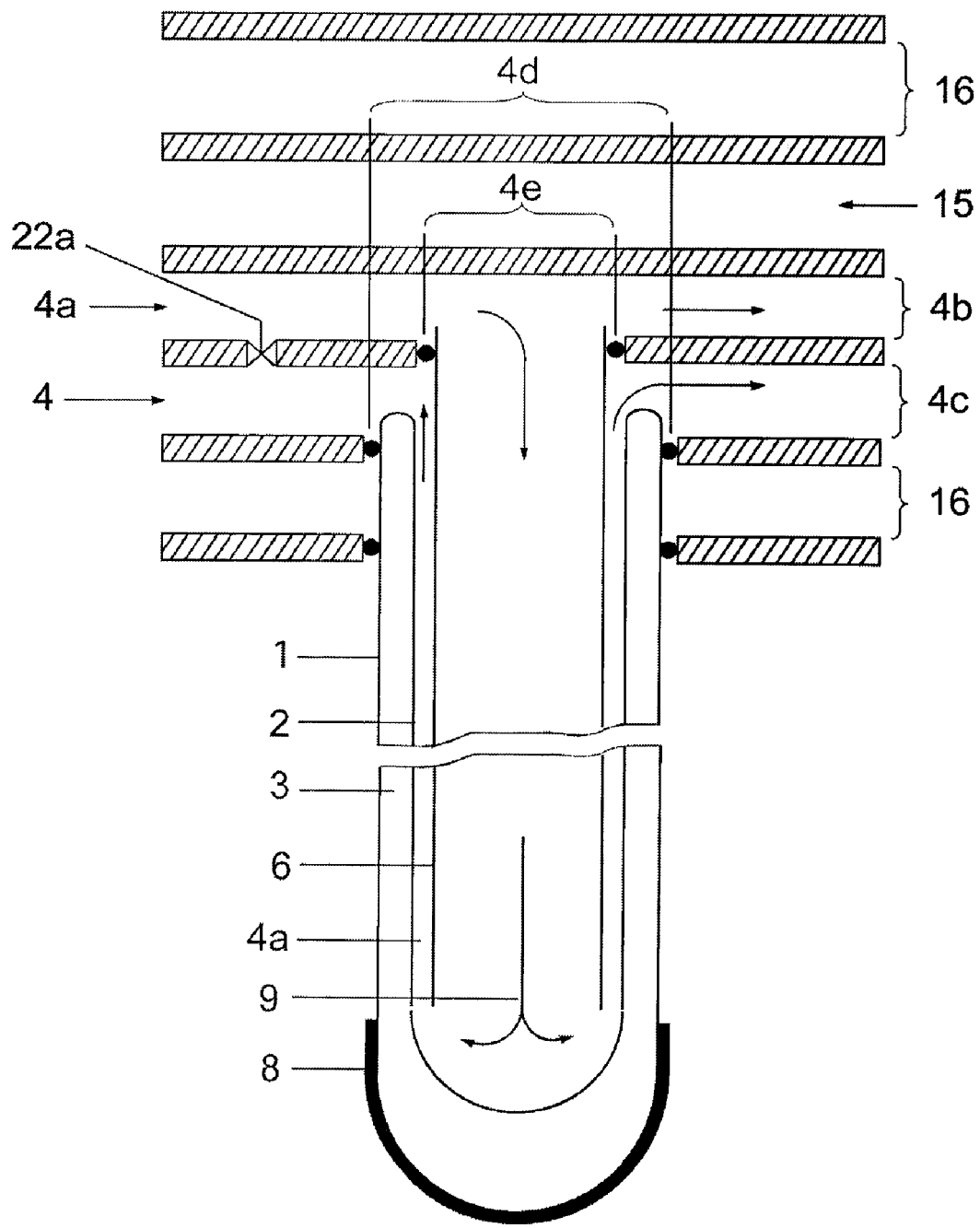
FIG. 7 a longitudinal section of a manifold segment with a Sydney tube and a coaxial tube.

FIG. 7 shows the design of a manifold segment 18 in longitudinal section. The collector tube 1, 2 will be fastened in the manifold segment 18 through an opening 4d so that it ends in the manifold channel 4c. The coaxial tube 6, 6a ends in the manifold channel 4b through an opening 4e in the manifold segment 18. The opening 4e constitutes the inlet of the (cold) heat transfer medium from the manifold segment 18 in the coaxial tube 6. The opening 4d constitutes the outlet of the (heated) heat transfer medium from the collector tube 1, 2 in the manifold segment 18. The cold heat transfer medium 4a flows from a manifold channel 4b into the coaxial tube 6 and moves according to the flow direction 9 between coaxial tube 6 and absorber tube 2 again to the manifold where it ends in a manifold channel 4c. To reach a constant circulation of the heat transfer medium 4, 4a in the collector tubes 1, 2 and a coaxial tube 6, it is useful to equally distribute the decreases in pressure within one collector field with a Tichelmann-connection. The manifold channel 15 directs the heat transfer medium to the end of the collector field, in order that the sum of the distances for the inlet and outlet of the heat transfer medium is equal for every collector tube. The manifold channels 16 are designed for heat insulation, they can also be filled with adequate materials. A distribution valve 22a can be integrated between the manifold channel 4b for the cold heat transfer medium and 4c for the warm heat transfer medium, to allow similar to valve 22 in FIG. 6 a circulation of the heat transfer medium 5, 5a, 4, 4a.

Figure 8:
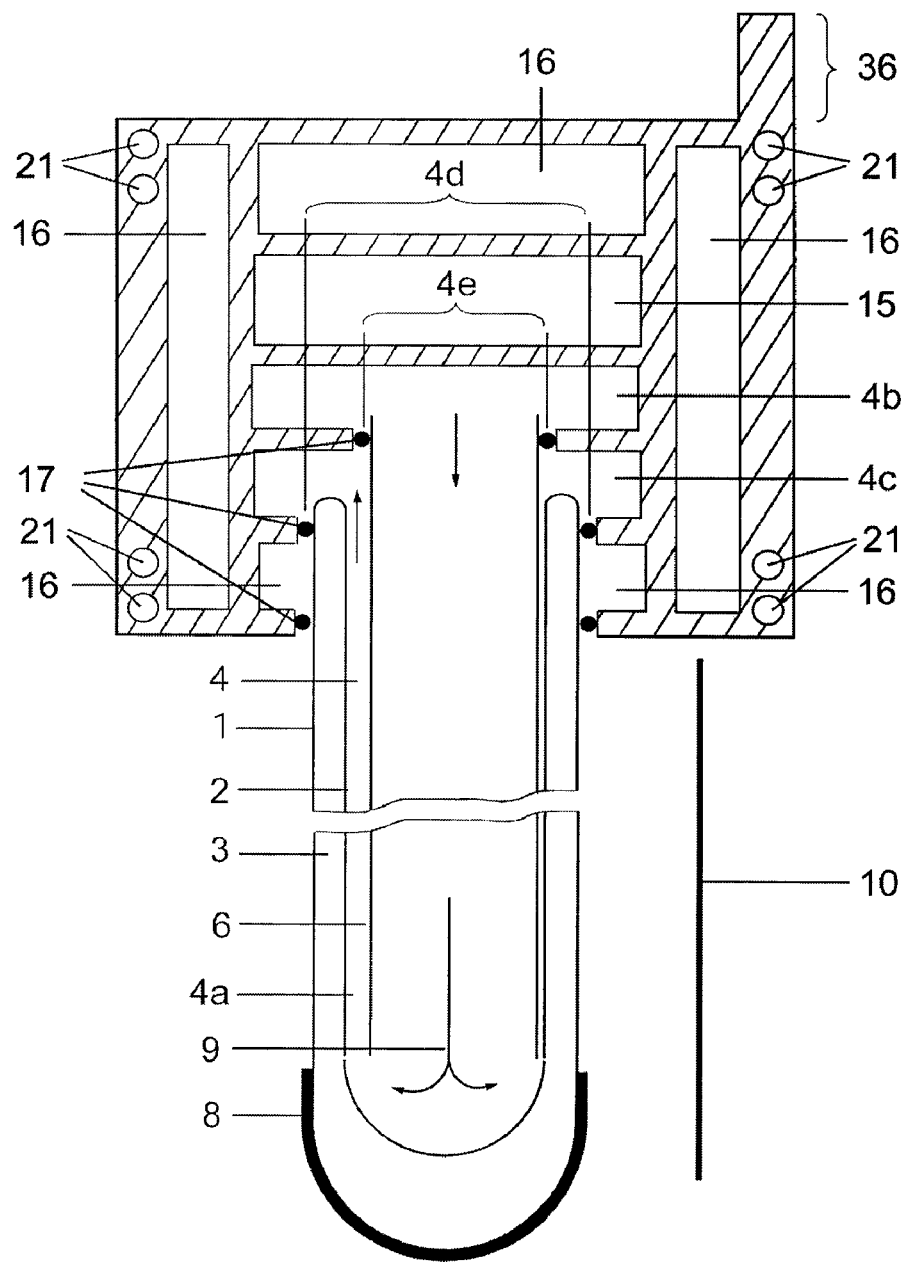
FIG. 8 a cross-section of a manifold segment with a Sydney tube and a coaxial tube.

FIG. 8 shows a cross-section of a manifold segment 18 with a vacuum tube 1, 2 and a coaxial tube 6. A reflector 10 marks the back side of the collector tube 1, 2. The collector tubes 1, 2 respectively the coaxial tube 6 will be fastened and sealed up with tube seals 17 in the openings 4d, 4e. Special bores 21 are provided, in which the connection elements 20, for example threaded rods, can be put, to join several manifold segments 18 with each other. The bores 21 can advantageously be placed in pairs, to allow the assembly of an arbitrarily long collector field. A mounting device 36 allows the fastening of the collector on a stand or a flat roof mounting system.

Figure 9:
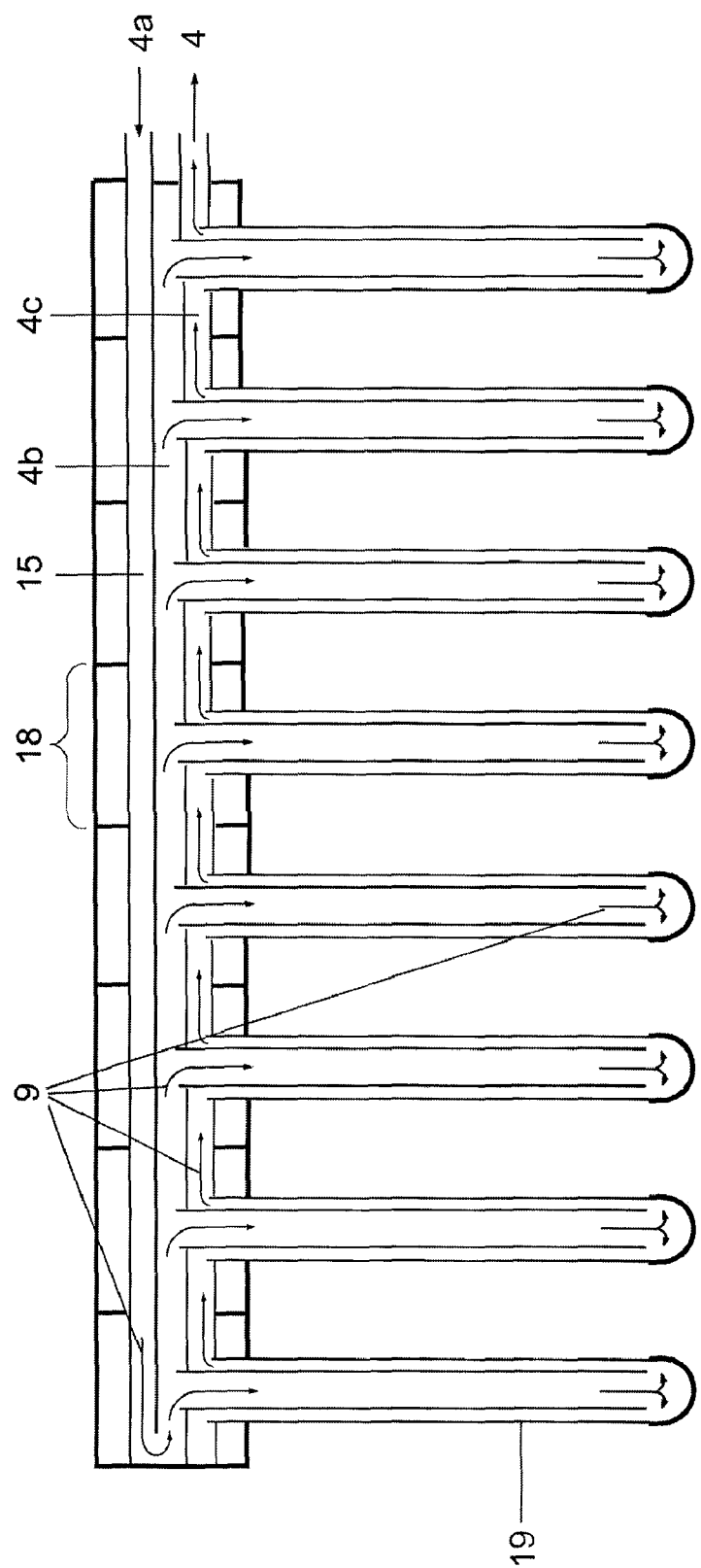
FIG. 9 the flow of the heat transfer medium in a longitudinal section through a collector comprising of several manifold segments with Sydney tubes.

FIG. 9 shows the layout of a collector field consisting of several manifold segments 18, each with a collector tube 19. By stringing together several manifold segments, channel 4b, 4c, 15 are created, in which the heat transfer medium 4, 4a flows according to the arrows 9.

FIG. 10a to 10c show how the several manifold segments 18 can be assembled to one collector field. FIG. 10a shows a collector field consisting of four manifold segments 18. The manifold segments 18 are joined by connecting elements 20. FIG. 10b shows exemplary how further manifold segments 18 can be connected to a collector field consisting of four manifold segments 18. For that purpose, further connection elements 20 are fixed in the parallel openings 21 of the last manifold segment. Seals 17b and manifold segments 18 are attached alternately on these connection elements 20 and are hydraulically sealed. FIG. 10c shows how the alternating use of the pairwise bores 21 for the connection elements 20 allow an arbitrarily long collector field to be built.

Figure 11:
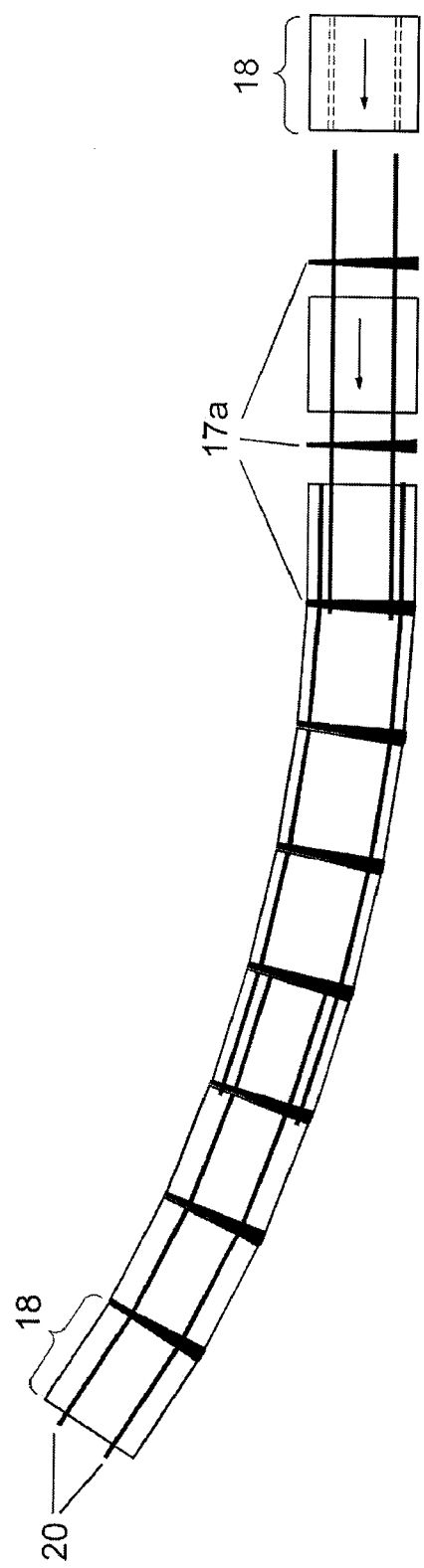
FIG. 11 the assembly of a curved collector field.

FIG. 11 shows how the collector according to the invention can be adjusted to a curved mounting surface. The collector field is shown from above. To achieve the curve in the collector field, conical seals 17a or special cones are used to mount the collector field. The curve can be adjusted to the needs with different material thicknesses of the seals 17a.

Figure 12:
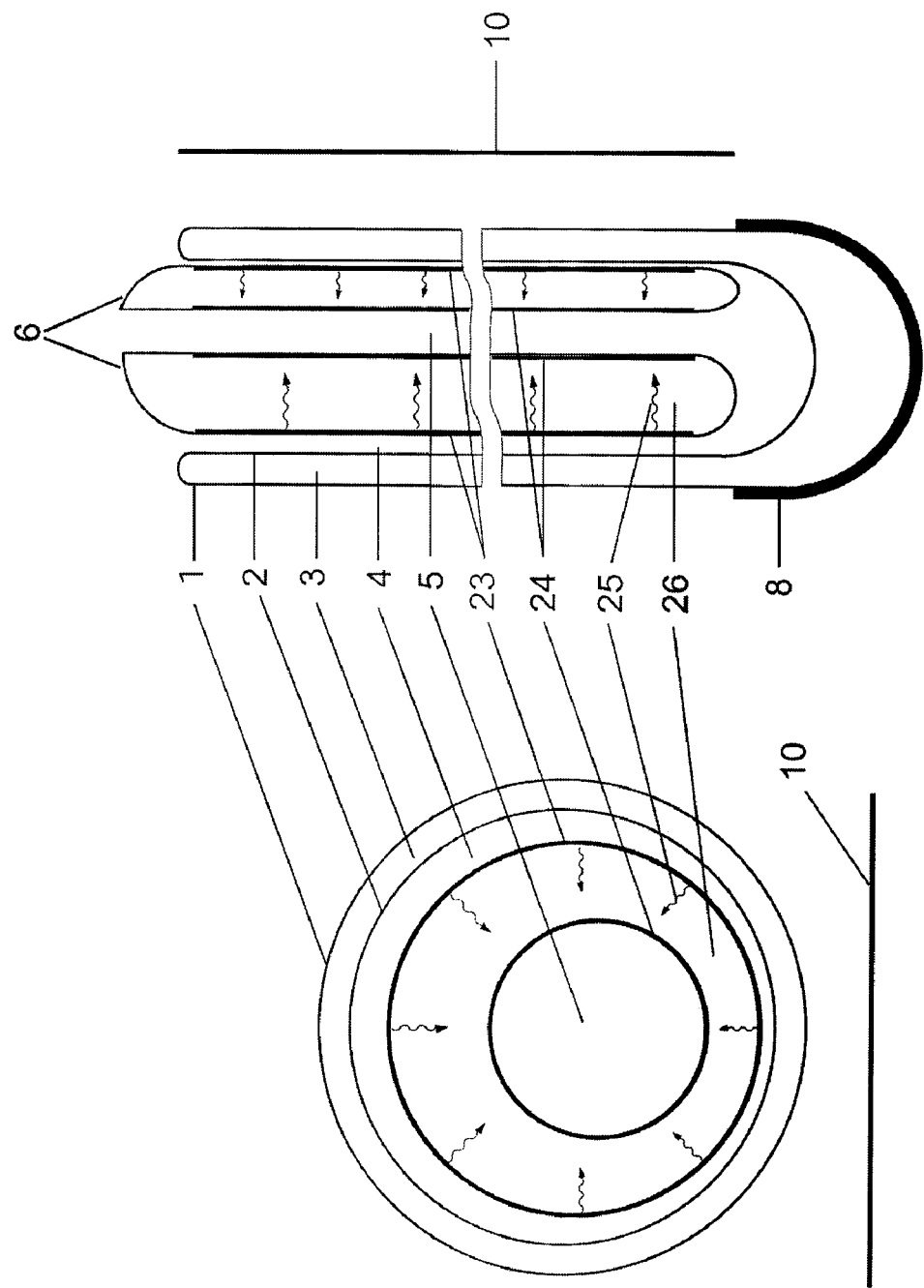
FIG. 12 heat transfer onto the cold water reservoir by heat radiation.

FIG. 12 shows the heat transfer from the warm heat transfer medium 4 to the cold water reservoir 5. A variable selective coating 23 which is on the inside of the outer coaxial tube is heated by the warm heat transfer medium 4. This variable selective coating 23 emits no heat radiation 25 at low temperatures, as prevailing in normal operation of the collector. Only at high temperatures, like in case of stagnation, or when exceeding a limit temperature, the variable selective coating 23 is able to radiate heat 25. The outside of the inner coaxial tube can be advantageously provided with an absorber coating 24, which absorbs the heat radiation 25 and transfers it to the cold water reservoir 5. To avoid heat transfer to occur also at low temperatures in the coaxial tube as a result of thermal conduction, the coaxial tube 26 can be evacuated.

Figure 13:
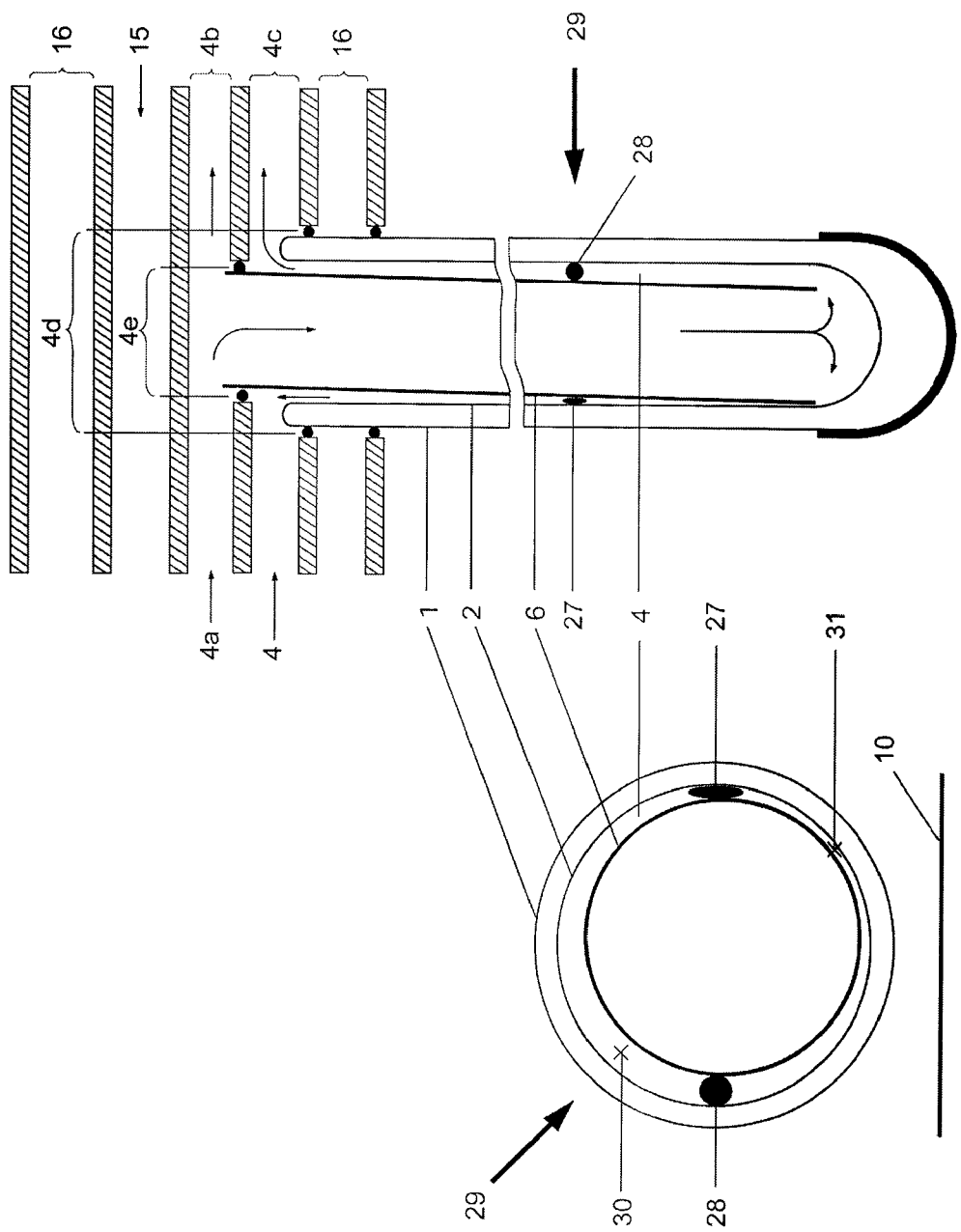
FIG. 13 the adjustment of the coaxial tube in the collector tube.

The adjustment of the coaxial tube in the collector tube is shown in FIG. 13. Devices or components of a device 27, 28, which change their form and/or volume at temperature changes, are located between absorber tube 2 and coaxial tube 6. If one of the devices or components 27, 28 is stronger 28 heated up by the solar radiation 29 than the others 27, the coaxial tube will be adjusted to the side and the gap between absorber tube 2 and coaxial tube 6 will be increased. On the sun-facing side, a gap emerges with the highest volume of the to-be-heated heat transfer medium 30. On the sun-averted side, a gap emerges with the smallest volume 31 of the heat transfer medium.

Figure 14B:
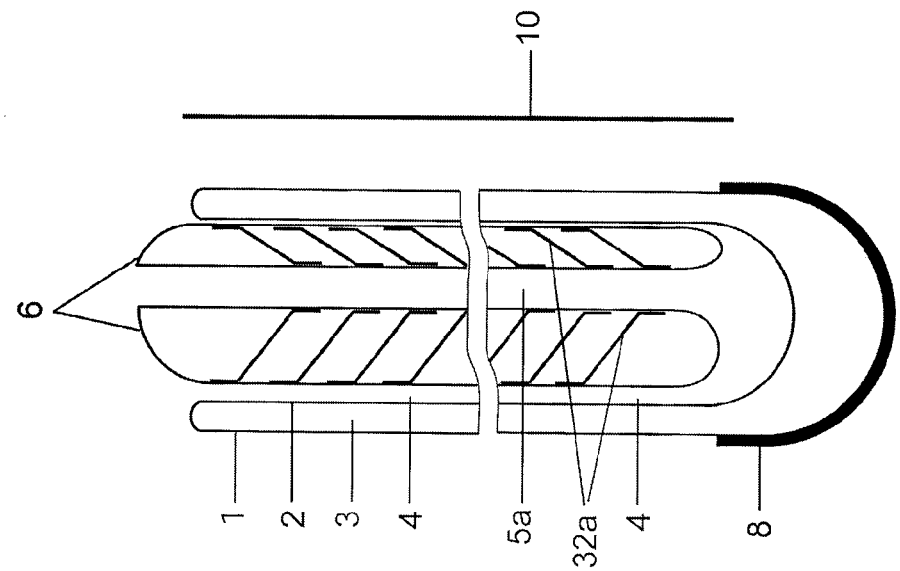
FIG. 14b the regulation of the heat transfer onto the cold water reservoir by heat bridges from materials with shape memory in the heated state.
Figure 14A:
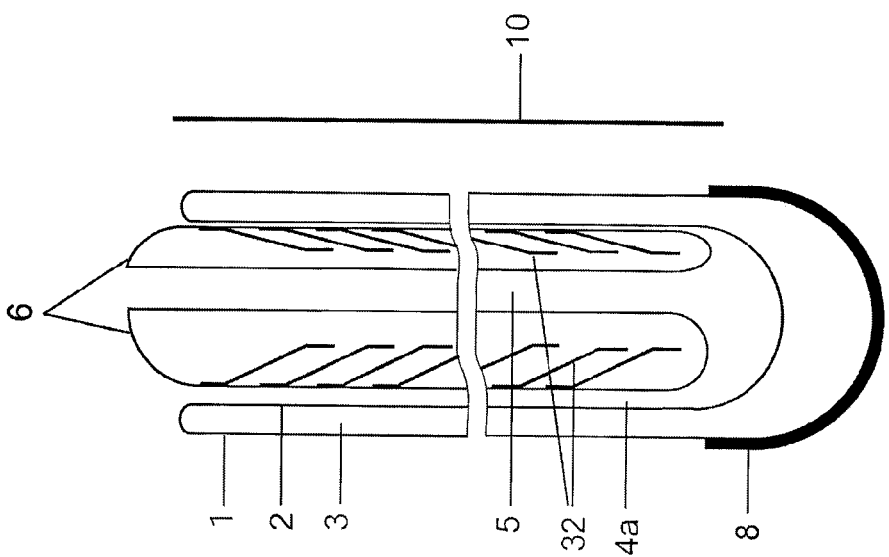
FIG. 14a the regulation of the heat transfer onto the cold water reservoir by heat bridges from materials with shape memory in the cold state.

In FIGS. 14a and 14b it is shown how the heat is transferred in the coaxial tube 6 from the warm heat transfer medium 4 to the cold water reservoir 5. During normal operation, the heat transfer medium 4 is not warm enough to change the form of the material with shape memory 32 strong enough to create a heat bridge. The material with shape memory rests only against the side of the passing heat transfer medium 4, whereas the inside of the coaxial tube 6 to the cold water reservoir 5 will not be touched. This condition is shown in FIG. 14a. If the heat transfer medium 4 heats up beyond normal operating temperature, the material with shape memory 32a will deform that strong that—as it is shown in FIG. 14b—it rests against the inside of coaxial tube 6 and that it will transfer heat over the emerging heat bridge from the heat transfer medium 4 to the cold water reservoir 5a.

In FIG. 15a a Sydney tube according to prior art with heat conducting sheets is shown in cross-section and in FIG. 15b it is shown in longitudinal section. The incident light 29 is absorbed in the absorber tube 2. The emerging heat must be transferred on a heat conducting sheet 33 and then on a U-shaped tube 35. The emerging thermal contact resistances 34 have a negative effect on the collector efficiency.

Figure 16:
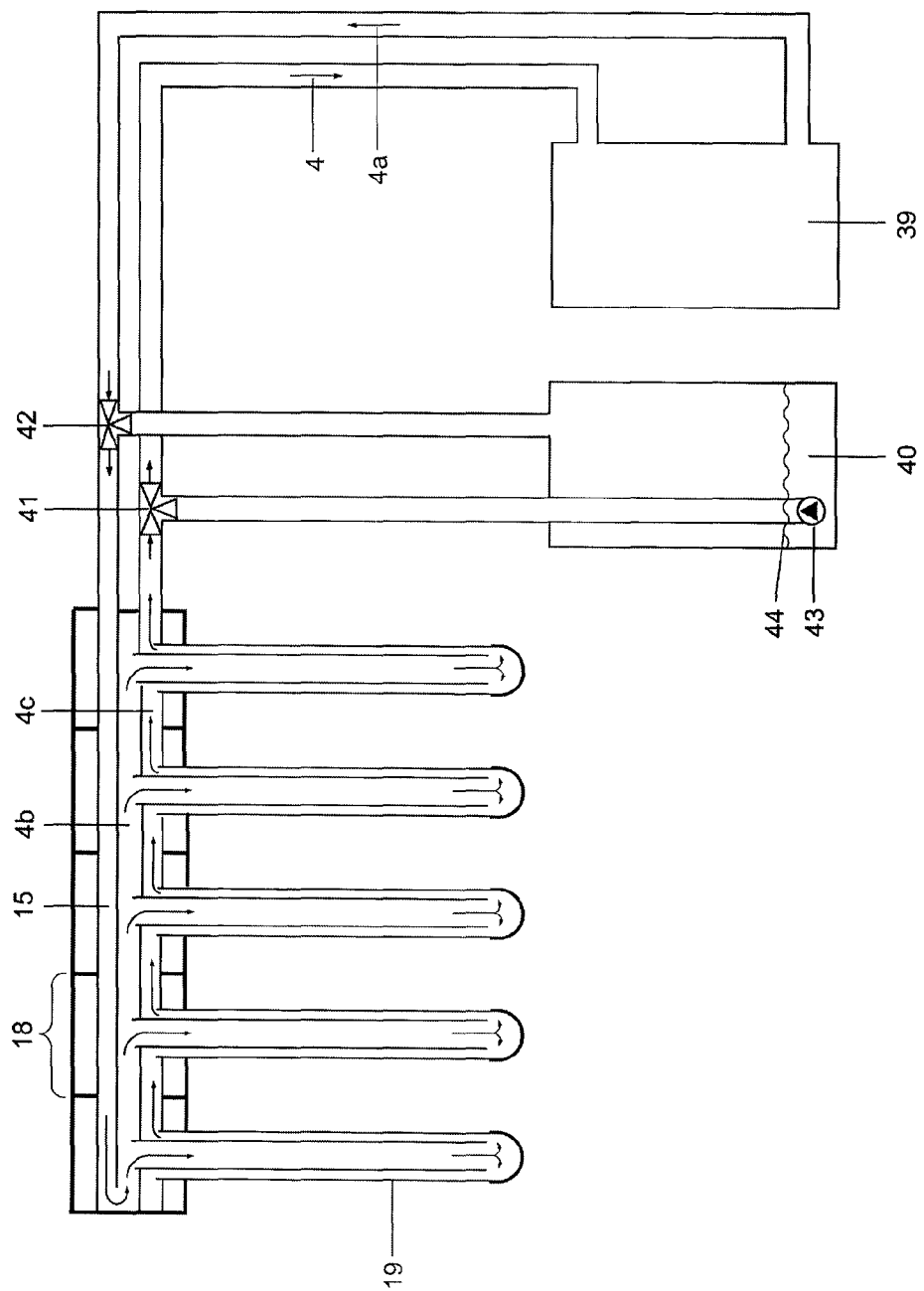
FIG. 16 the connection to a drainback system during normal operation.

FIG. 16 shows the connecting of the collector according to this invention 18, 19 to a drainback system during normal operation of the solar system. The to-be-heated heat transfer medium 4a flows from the heat storage 39 through the valve 42 into the collector. The valve 42 is open according to the indicated arrows. The branch pipe to the drainback box 40 is closed. After the heat transfer medium has passed through the collector 18, 19, it goes back through the valve 41 into the heat storage 39. The valve 41 is open according to the indicated arrows. The branch to the drainback box 40 is closed.

Figure 17:
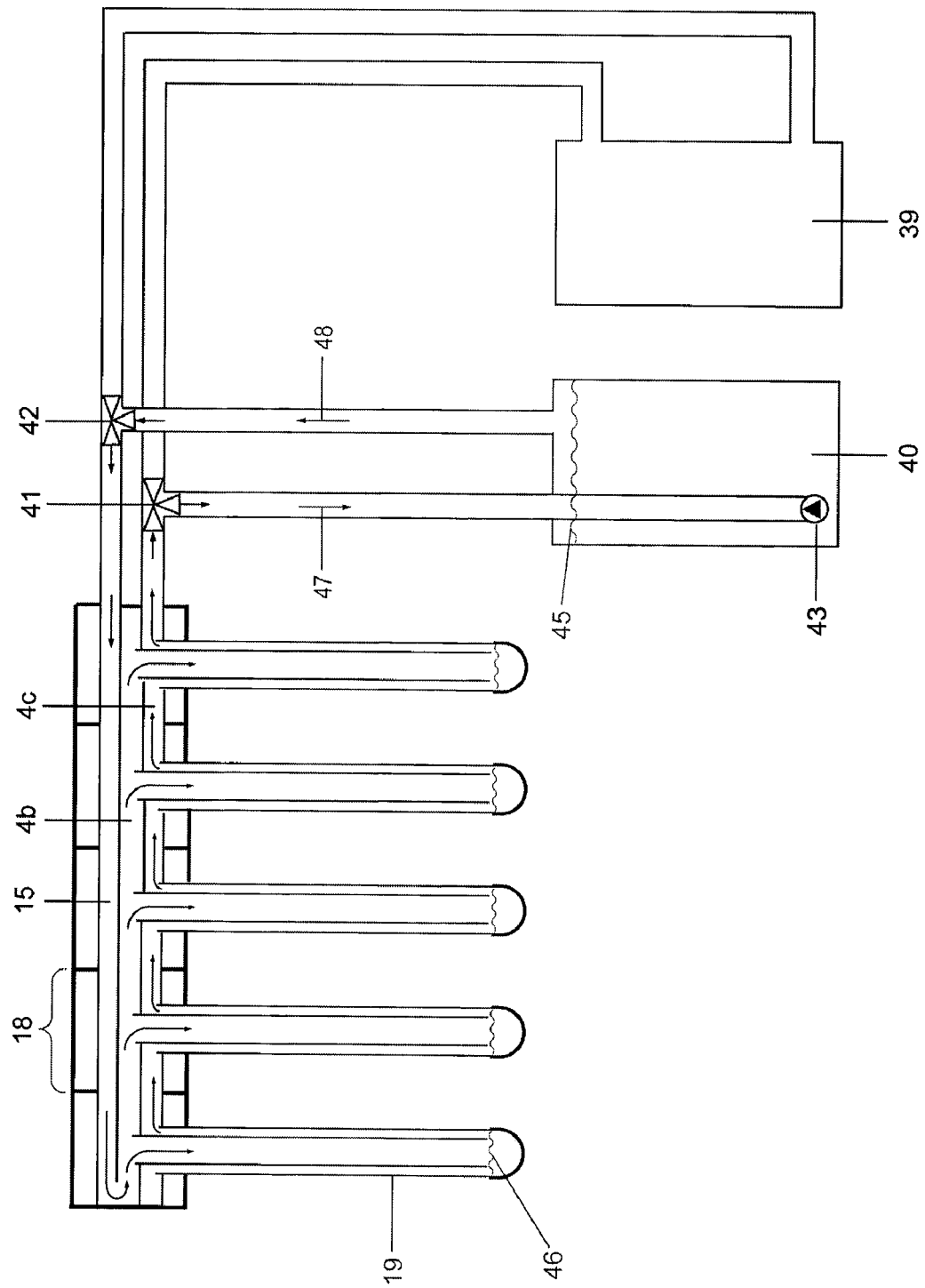
FIG. 17 the connection to a drainback system when the collectors are empty.

FIG. 17 shows the connecting of the collector according to this invention 18, 19 to a drainback system after the collector has been drained 18, 19. The valve 41 is put into a position in which the heat transfer medium flows from the collector 18, 19 according to the direction of the arrows into the drainback box 40. The connection from valve 41 to the heat storage 39 is closed. If the drainback box 40 is located below the collectors 18, 19, the heat transfer medium will flow independently through gravity into the drainback box 40. If that is not the case, the pump 43 will pump down the heat transfer medium. To ventilate the collectors 18, 19, the valve 42 will be set in a position so that air can flow from the drainback box 40 to the collector according to the direction of arrow. The connection of the valve 42 to the heat storage 39 is closed. It is possible to drain the collector tubes 19 up to the fill level 46, from where air is sucked in. The filling of the collectors 18, 19 is done by a pump 43 which pumps the heat transfer medium from the drainback box 40 through the valve 41 into the collector 18, 19. The air that is escaping from the collector 18, 19 will be directed through the valve 42 into the drainback box 40. After the collectors 18, 19 have been filled, the valves 41, 42 are put in a position that the drainback box 40 is closed and the heat transfer medium 4, 4a can circulate between collector 18, 19 and heat storage 39. In a further advantageous embodiment, the function of the drainback box 40 can be integrated in the heat storage 39.

Figure 18:
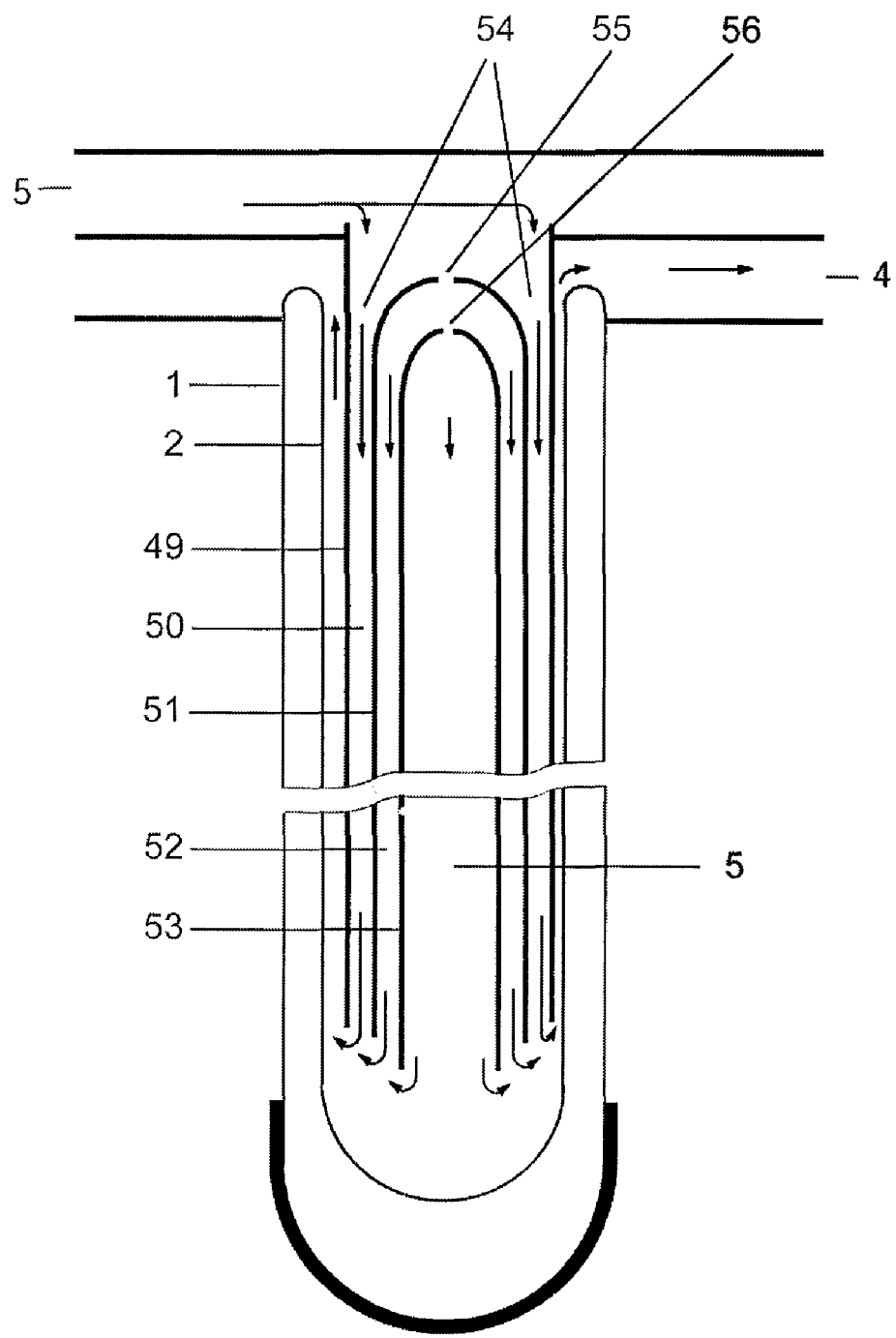
FIG. 18 the design and function of a coaxial tube with several layers during normal operation.

FIG. 18 shows a coaxial tube consisting of several layers through which the incoming cold heat transfer medium 5 flows. The main part of the incoming cold heat transfer medium 5 flows through the outer layer of the coaxial tube 50, since the opening 54 of the outer tube 49 is bigger than the opening 55 of the second tube of the coaxial tube 51. The heat transfer medium flows according to the indicated arrows to the other end of the coaxial tube and absorbs the heat which is transferred through the outer tube 49. The heat transfer medium flows in a gap between absorber tube 2 and outer tube of the coaxial tube 49. With a third tube of the coaxial tube 53, a second layer of the coaxial tube 52 is created. Through the second layer of the coaxial tube 52 flows a smaller amount of heat transfer medium 5 than through the outer layer of the coaxial tube 50, but more than into the inside of the third tube of the coaxial tube 53, because only a part of the heat transfer medium that reached tube 51 flows through the opening 56 of the tube 53. The heat transfer medium reaches through the openings 54, 55, 56—possibly through further identical, not indicated layers—with increasingly smaller volume flow rates the inside of the coaxial tube to the cold water reservoir 5. Also in the layer 52 and every other, not indicated layer of the coaxial tube, heat, which has been transferred through the walls of the tubes 49, 51, 53 and every other, not indicated tube, is carried to the other end of the coaxial tube. The openings 54, 55, 56 serve for the ventilation of the coaxial tube layers 50, 52, the cold water reservoir 5 as well as for other, not indicated layers of the coaxial tube.

Figure 19:
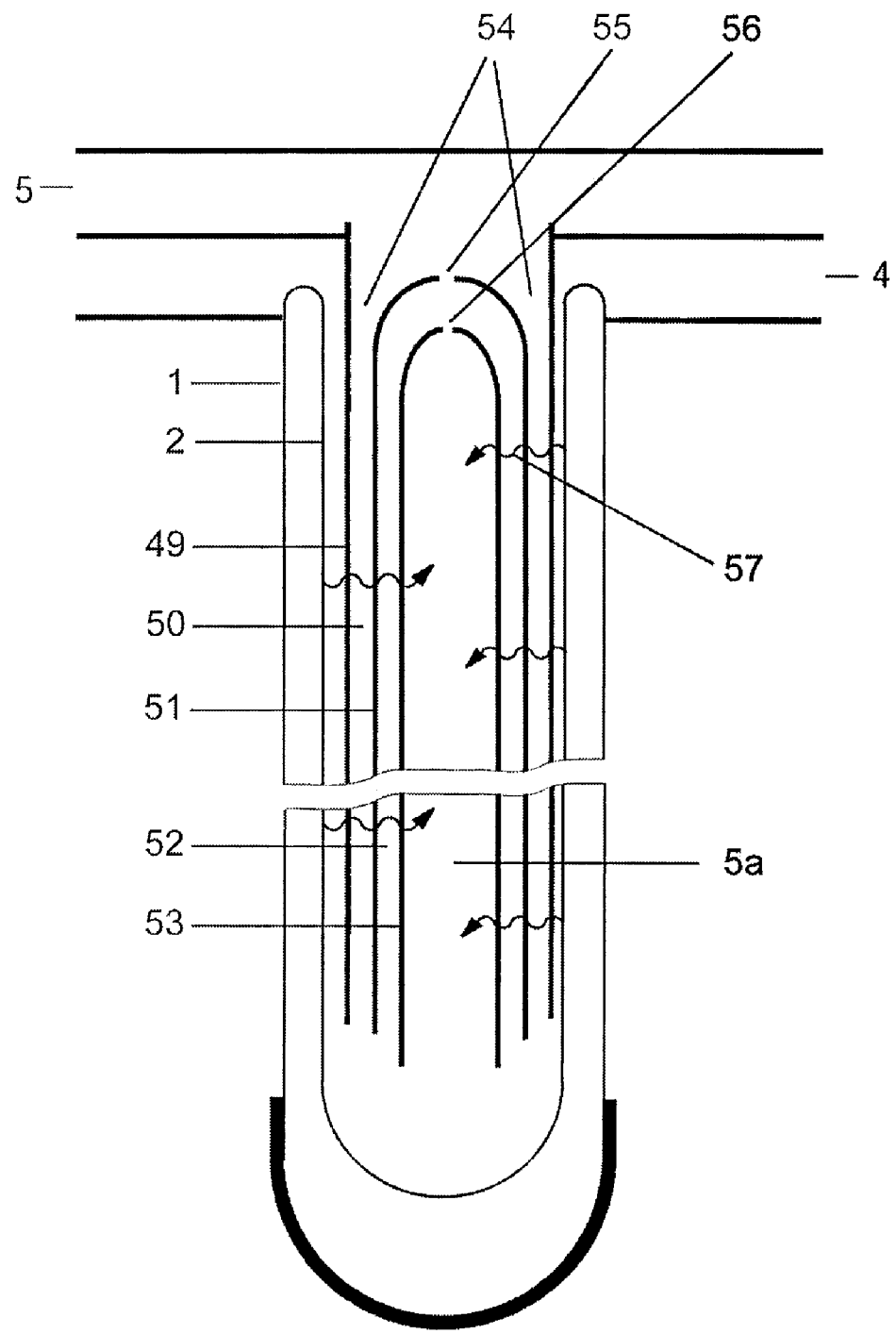
FIG. 19 the function of a coaxial tube with several layers during stagnation.

FIG. 19 shows the heat transfer through the coaxial tube which consists of several layers 50, 52, during stagnation. Since no heat is removed together with the volume flow of the heat transfer medium 5 from the layers 50, 52 and other, not indicated layers, the heat is transferred 57 from the absorber layer into the inside of the coaxial tube to the cold water reservoir 5a according to the thermal conductivity of the heat transfer medium and of the tubes 49, 51 and 53 and further, not indicated tubes.

The invention also comprises a manifold or a manifold segment for a collector tube, whose only specific feature is that it is made of plastic, preferably by injection molding.

LIST OF USED REFERENCE NUMERALS 1 cover tube
2 absorber tube
3 vacuum
4 warm heat transfer medium
4a to-be-heated cold heat transfer medium
4b manifold channel for cold heat transfer medium
4c manifold channel for warm heat transfer medium
4d second opening (outlet)
4e first opening (inlet)
5 incoming cold heat transfer medium, cold water reservoir
5a heated heat transfer medium in the cold water reservoir
6 coaxial tube
6a convection carboy
7 liquid convection medium
7a evaporated convection medium
8 protection cap
9 direction of flow of the heat transfer medium
10 reflector
11 convection in the convection carboy
12 heat emission through convection carboy
13 heat emission through convection of the heat transfer medium
14 convection of the heat transfer medium
15 manifold channel for the Tichelmann-system
16 cavity for heat insulation
17 tube seal
17a conical seal
17b manifold seal
18 manifold segment
19 collector tube with coaxial tube 20 connection element for manifold segments
21 bore for connection element
22 valve
22a distribution valve
23 variable selective coating of the outer coaxial tube
24 absorber coating of the inner coaxial tube
25 heat radiation
26 vacuum of the coaxial tube
27 cold component to adjust the coaxial tube
28 warm component to adjust the coaxial tube
29 direction of solar radiation
30 place of the largest volume of the heat transfer medium
31 place of the smallest volume of the heat transfer medium
32 material with shape memory cold condition
32a material with shape memory warm condition
33 heat conducting sheet
34 thermal contact resistance
35 U-shaped tube for heat transfer medium
36 mounting device
37 sealant
38 gas in the convection carboy
39 heat storage
40 drainback box
41 valve to drain and fill the collector tubes with the heat transfer medium
42 valve to vent the collector tubes
43 pump to fill the collector tubes
44 fill level in the drainback box during operation of the solar system
45 fill level in the drainback box when collectors are drained
46 fill level of collector tubes after draining
47 flow direction of heat transfer medium when collectors are drained
48 airflow during ventilation of the collectors
49 outer tube of the coaxial tube
50 outer layer of the coaxial tube
51 second tube of the coaxial tube
52 second layer of the coaxial tube
53 third tube of the coaxial tube
54 opening of the outer tube
55 opening of the second tube
56 opening of the third tube
57 heat transfer through the layers of the coaxial tube during stagnation

The invention claimed is:

1. Collector tube for a solar collector, comprising:
a cover tube,
an absorber tube, which is located inside the cover tube and in which a heat transfer medium can be conducted, and
an inner tube element, which is located inside of the absorber tube and which has a variable thermal conductivity,
wherein the absorber tube and the inner tube element are arranged such that the heat transfer medium can be carried into the collector tube through the inner tube element, and carried away from the collector tube between the outside of the inner tube element and the inner surface of the absorber tube, to flow directly along the inner surface of the absorber tube,
wherein the thermal conductivity is a flow-dependent variable, and
wherein the inner tube element is a double-walled tube, and the inner tube element has openings on both ends.

2. Collector tube according to claim 1, wherein the flows of the heat transfer medium inside the inner tube element are different from each other.

3. Collector tube according to claim 1, wherein the inner tube element consists of a material that changes thermal conductivity according to a temperature-dependent modification of its molecular structure.

4. Manifold segment for a single collector tube according to claim 1, comprising:
a first opening adapted to receive a heat transfer medium in the collector tube,
a second opening adapted to discharge the heat transfer medium from the collector tube,
an inlet channel adapted to receive the heat transfer medium from outside of the collector tube into the collector tube, and
an outlet channel adapted to discharge the heat transfer medium from the collector tube to outside of the collector tube,
wherein the inlet channel and the outlet channel are arranged such that the manifold segment can be directly connected to at least one further identical manifold segment in a heat transfer medium circuit, and wherein the manifold segment is made of plastic.

5. Manifold segment according to claim 4, wherein the first opening and the second opening are arranged such that the first and second openings are combinable with the inner tube element of the collector tube, wherein the inner tube element is eccentrically arranged within the absorber tube.

6. Manifold segment according to claim 5, further comprising arrangements for thermal insulation of the heat transfer medium.

7. Manifold segment according to claim 5, further comprising devices to connect to at least one additional manifold segment.

8. Manifold segment according to claim 5, further comprising fittings for a fixing device of the manifold segment.

9. Manifold element according to claim 5, wherein the collector tube further comprises one or more components adapted to adjust the eccentricity of the inner tube element.

10. Collector tube for a solar collector, comprising:
a cover tube,
an absorber tube, which is located inside the cover tube and in which a heat transfer medium can be conducted, and
an inner tube element, which is located inside of the absorber tube and which has a variable thermal conductivity,
wherein the absorber tube and the inner tube element are arranged such that the heat transfer medium can be carried into the collector tube through the inner tube element, and carried away from the collector tube between the outside of the inner tube element and the inner surface of the absorber tube, to flow directly along the inner surface of the absorber tube,
wherein the thermal conductivity is temperature-dependent variable, and
wherein the inner tube element is designed as double-walled tube between the walls of which a convection medium is enclosed that effectuates the temperature-dependent variable thermal conductivity.

11. Collector tube according to claim 10, wherein the variable thermal conductivity is effectuated by the evaporation of the convection medium when the convection medium is heated up.

12. Collector tube according to claim 11, further comprising a substance located between the walls of the double-walled tube which essentially inhibits the evaporation of the convection medium from taking place below a boiling point of the convection medium.

13. Collector tube according to claim 12, wherein the substance is characterized by at least one of the following properties: having a higher boiling point than the convection medium, having a smaller specific weight than the convection medium, and not being mixable with the convection medium.

14. Collector tube according to claim 10, wherein the inner tube element consists of a material that changes thermal conductivity according to a temperature-dependent modification of its molecular structure.

15. Manifold segment for a single collector tube according to claim 10, comprising:
- a first opening adapted to receive a heat transfer medium in the collector tube,
- a second opening adapted to discharge the heat transfer medium from the collector tube,
- an inlet channel adapted to receive the heat transfer medium from outside of the collector tube into the collector tube, and
- an outlet channel adapted to discharge the heat transfer medium from the collector tube to outside of the collector tube, wherein the inlet channel and the outlet channel are arranged such that the manifold segment can be directly connected to at least one further identical manifold segment in a heat transfer medium circuit, and wherein the manifold segment is made of plastic.

16. Manifold segment according to claim 15, wherein the first opening and the second opening are arranged such that the first and second openings are combinable with the inner tube element of the collector tube, wherein the inner tube element is eccentrically arranged within the absorber tube.

17. Manifold segment according to claim 16, further comprising arrangements for thermal insulation of the heat transfer medium.

18. Manifold segment according to claim 16, further comprising devices to connect to at least one additional manifold segment.

19. Manifold segment according to claim 16, further comprising fittings for a fixing device of the manifold segment.

20. Manifold element according to claim 16, wherein the collector tube further comprises one or more components adapted to adjust the eccentricity of the inner tube element.

21. Collector tube for a solar collector, comprising:
- a cover tube,
- an absorber tube, which is located inside the cover tube and in which heat transfer medium can be conducted, and
- an inner tube element, which is located inside of the absorber tube and which has a variable thermal conductivity, wherein the absorber tube and the inner tube element are arranged such that the heat transfer medium can be carried into the collector tube through the inner tube element, and carried away from the collector tube between the outside of the inner tube element and the inner surface of the absorber tube, to flow directly along the inner surface of the absorber tube, wherein the thermal conductivity is temperature-dependent variable, and wherein the inner tube element is double-walled and comprises parts having shape memory, which change depending on a temperature of the heat transfer medium outside the inner tube element by generating heat bridges between the double walls of the inner tube element.

22. Collector tube according to claim 21, wherein the inner tube element consists of a material that changes thermal conductivity according to a temperature-dependent modification of its molecular structure.

23. Manifold segment for a single collector tube according to claim 21, comprising:
- a first opening adapted to receive a heat transfer medium in the collector tube,
- a second opening adapted to discharge the heat transfer medium from the collector tube,
- an inlet channel adapted to receive the heat transfer medium from outside of the collector tube into the collector tube, and
- an outlet channel adapted to discharge the heat transfer medium from the collector tube to outside of the collector tube, wherein the inlet channel and the outlet channel are arranged such that the manifold segment can be directly connected to at least one further identical manifold segment in a heat transfer medium circuit, and wherein the manifold segment is made of plastic.

24. Manifold segment according to claim 23, wherein the first opening and the second opening are arranged such that the first and second openings are combinable with the inner tube element of the collector tube, wherein the inner tube element is eccentrically arranged within the absorber tube.

25. Manifold segment according to claim 24, further comprising arrangements for thermal insulation of the heat transfer medium.

26. Manifold segment according to claim 24, further comprising devices to connect to at least one additional manifold segment.

27. Manifold segment according to claim 24, further comprising fittings for a fixing device of the manifold segment.

28. Manifold element according to claim 24, wherein the collector tube further comprises one or more components adapted to adjust the eccentricity of the inner tube element.

29. Collector tube for a solar collector, comprising:
- a cover tube,
- an absorber tube, which is located inside the cover tube and in which a heat transfer medium can be conducted, and
- an inner tube element, which is located inside of the absorber tube and which has a variable thermal conductivity, wherein the absorber tube and the inner tube element are arranged such that the heat transfer medium can be carried into the collector tube through the inner tube element, and carried away from the collector tube between the outside of the inner tube element and the inner surface of the absorber tube, to flow directly along the inner surface of the absorber tube, and wherein the inner tube element is a double-walled tube having an outer wall having a first selective coating on an inside surface that is adapted, at higher temperatures, to radiate heat, and having an inner wall having a second selective coating on an outside surface that is adapted to absorb heat.

30. Collector tube according to claim 29, wherein the inner tube element consists of a material that changes thermal conductivity according to a temperature-dependent modification of its molecular structure.

31. Manifold segment for a single collector tube according to claim 29, comprising:
- first opening adapted to receive a heat transfer medium in the collector tube,
- a second opening adapted to discharge the heat transfer medium from the collector tube, an inlet channel adapted to receive the heat transfer medium from outside of the collector tube into the collector tube, and an outlet channel adapted to discharge the heat transfer medium from the collector tube to outside of the collector tube, wherein the inlet channel and the outlet channel are arranged such that the manifold segment can be directly connected to at least one further identical manifold segment in a heat transfer medium circuit, and wherein the manifold segment is made of plastic.

32. Manifold segment according to claim 31, wherein the first opening and the second opening are arranged such that the first and second openings are combinable with the inner tube element of the collector tube, wherein the inner tube element is eccentrically arranged within the absorber tube.

33. Manifold segment according to claim 32, further comprising arrangements for thermal insulation of the heat transfer medium.

34. Manifold segment according to claim 32, further comprising devices to connect to at least one additional manifold segment.

35. Manifold segment according to claim 32, further comprising fittings for a fixing device of the manifold segment.

36. Manifold element according to claim 32, wherein the collector tube further comprises one or more components adapted to adjust the eccentricity of the inner tube element.

* * * * *